(12) United States Patent
Tanaka et al.

(10) Patent No.: US 10,587,677 B2
(45) Date of Patent: Mar. 10, 2020

(54) CONTROL APPARATUS, COMPUTER READABLE MEDIUM, AND EQUIPMENT CONTROL SYSTEM

(71) Applicant: MITSUBISHI ELECTRIC CORPORATION, Tokyo (JP)

(72) Inventors: Masaki Tanaka, Tokyo (JP); Eiichi Horiuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/773,288

(22) PCT Filed: Jan. 20, 2016

(86) PCT No.: PCT/JP2016/051605
§ 371 (c)(1),
(2) Date: May 3, 2018

(87) PCT Pub. No.: WO2017/126063
PCT Pub. Date: Jul. 27, 2017

(65) Prior Publication Data
US 2018/0332101 A1 Nov. 15, 2018

(51) Int. Cl.
*H04L 29/08* (2006.01)
*G06F 9/54* (2006.01)
(Continued)

(52) U.S. Cl.
CPC ............ *H04L 67/10* (2013.01); *G06F 9/54* (2013.01); *H04L 12/02* (2013.01); *H04L 41/082* (2013.01);
(Continued)

(58) Field of Classification Search
CPC . H04L 67/10; H04L 63/1441; H04L 63/0263; H04L 63/0236; H04L 41/082;
(Continued)

(56) References Cited

U.S. PATENT DOCUMENTS

2005/0271044 A1  12/2005 Hsu et al.
2006/0202834 A1   9/2006 Moriwaki
(Continued)

FOREIGN PATENT DOCUMENTS

JP   7-306820 A   11/1995
JP   8-65759 A    3/1996
(Continued)

OTHER PUBLICATIONS

"Software-Defined Networking: The New Norm for Networks", Open Networking Foundation, ONF White Paper, Apr. 13, 2012, pp. 1-12.
(Continued)

*Primary Examiner* — Jae Y Lee
(74) *Attorney, Agent, or Firm* — Birch, Stewart, Kolasch & Birch, LLP

(57) ABSTRACT

Upon acceptance of a setting instruction for communication equipment (110), a first control apparatus (200) transmits a first setting command to the communication equipment, and updates first management information to information associated with first setting. When an event is detected, a second control apparatus (300) transmits a second setting command to the communication equipment and transmits a second setting notification to the first control apparatus. When the first control apparatus receives the second setting notification, the first control apparatus updates the first management information to information associated with second setting.

10 Claims, 26 Drawing Sheets

(51) Int. Cl.
*H04L 12/02* (2006.01)
*H04L 12/24* (2006.01)
*H04L 29/06* (2006.01)

(52) U.S. Cl.
CPC .......... *H04L 41/0803* (2013.01); *H04L 41/12* (2013.01); *H04L 41/5096* (2013.01); *H04L 63/0236* (2013.01); *H04L 63/0263* (2013.01); *H04L 63/1441* (2013.01)

(58) Field of Classification Search
CPC . H04L 41/12; H04L 41/0803; H04L 41/5096; H04L 12/02; G06F 9/54
See application file for complete search history.

(56) References Cited

U.S. PATENT DOCUMENTS

| | | |
|---|---|---|
| 2007/0171052 A1 | 7/2007 | Moriwaki |
| 2008/0288636 A1 | 11/2008 | Moriwaki |
| 2013/0263243 A1 | 10/2013 | Imai |
| 2014/0324944 A1 | 10/2014 | Christopher et al. |
| 2015/0173007 A1 | 6/2015 | Hara et al. |
| 2016/0134527 A1* | 5/2016 | Kwak .................. H04L 45/586 370/352 |
| 2018/0191679 A1* | 7/2018 | Mulka .................... H04L 45/38 |

FOREIGN PATENT DOCUMENTS

| | | |
|---|---|---|
| JP | 2006-244120 A | 9/2006 |
| TW | 201138349 A1 | 11/2011 |
| TW | 201410045 A | 3/2014 |

OTHER PUBLICATIONS

Huang et al., "An OpenFlow-based Collaborative Intrusion Prevention System for Cloud Networking", pp. 85-92.
International Search Report for PCT/JP2016/051605 (PCT/ISA/210) dated Mar. 15, 2016.
Phemius et al., "DISCO: Distributed Multi-domain SDN Controllers", Aug. 29, 2013, Total of 8 pages.
Taiwanese Office Action issued in TW Patent Application No. 105114843 dated Jun. 28, 2017.
Office Action issued in corresponding German Application No. 11 2016 005 942.6 dated Feb. 7, 2019, with English Translation.

* cited by examiner

| PRIORITY | COMMAND TRIGGER |
|---|---|
| 1 | EVENT A (VIRUS DETECTION) |
| 2 | SETTING INSTRUCTION |
| 3 | EVENT B (DETECTION OF SUSPECTED VIRUS) |
| ⋮ | |

CONTROL APPARATUS, COMPUTER READABLE MEDIUM, AND EQUIPMENT CONTROL SYSTEM

TECHNICAL FIELD

The present invention relates to a technology for controlling equipment.

BACKGROUND ART

In recent years, as a network control method, there is provided a method of concentratedly controlling networks in multiple bases from a monitoring system. As a typical method, SDN (Software Defined Networking) may be pointed out.

Then, improvement in programmability of network control and improvement in quickness of the control are expected.

Non-Patent Literature 1 discloses a method of controlling, from an SDN controller, traffic that passes through communication equipment, using OpenFlow. The SDN controller corresponds to a network control apparatus, and OpenFlow is a protocol for controlling the communication equipment.

Overall traffic is controlled by concentrated network control, thereby allowing policy setting of an overall system.

As a system in which concentrated network control has been applied, there is provided a system of controlling a network according to an event that has occurred in a base.

Non-Patent Literature 2 discloses a technology of isolating traffic of an attack from a wide area network to a server in a base, using a concentrated network control technology and an attack detection system.

In a system where a network is concentratedly controlled, a wide area network is present between a network control apparatus and a base. In other words, a lot of relay apparatuses are interposed between the network control apparatus and the base. Therefore, a comparatively long period of time is needed for performing setting of communication equipment within the base from the network control apparatus.

Further, a packet for commanding the setting of the communication equipment may be lost in the middle of a communication path, so that the setting of the communication equipment may not be able to be performed.

CITATION LIST

Non-Patent Literature

Non-Patent Literature 1: Software-Defined Networking: The New Norm for Networks ONF White Paper, Apr. 13, 2012
Non-Patent Literature 2: Nen-Fu Huang et al, "An OpenFlow-based collaborative intrusion prevention system for cloud networking", 2015 IEEE International Conference on Communication Software and Networks (ICCSN)

SUMMARY OF INVENTION

Technical Problem

An object of the present invention is to allow equipment control from each of a first control apparatus and a second control apparatus.

Solution to Problem

A control apparatus of the present invention may include:
a first storage unit to store first management information for managing setting of equipment;
a first acceptance unit to accept a setting instruction that instructs first setting for the equipment;
a first command unit to generate a first setting command for making the setting of the equipment the first setting;
a first transmitting unit to transmit the first setting command;
a first receiving unit to receive a second setting notification being a notification that is transmitted from a second control apparatus when the second control apparatus makes the setting of the equipment second setting and being a notification for informing the second setting; and
a first update unit to update the first management information to information associated with the first setting when the first setting command is transmitted and to update the first management information to information associated with the second setting when the second setting notification is received.

Advantageous Effects of Invention

According to the present invention, equipment control can be performed from each of the first control apparatus and the second control apparatus.

BRIEF DESCRIPTION OF DRAWINGS

FIG. 13 is a configuration diagram of priority information (293, 393) in the third embodiment.

DESCRIPTION OF EMBODIMENTS

First Embodiment

Figure 1:
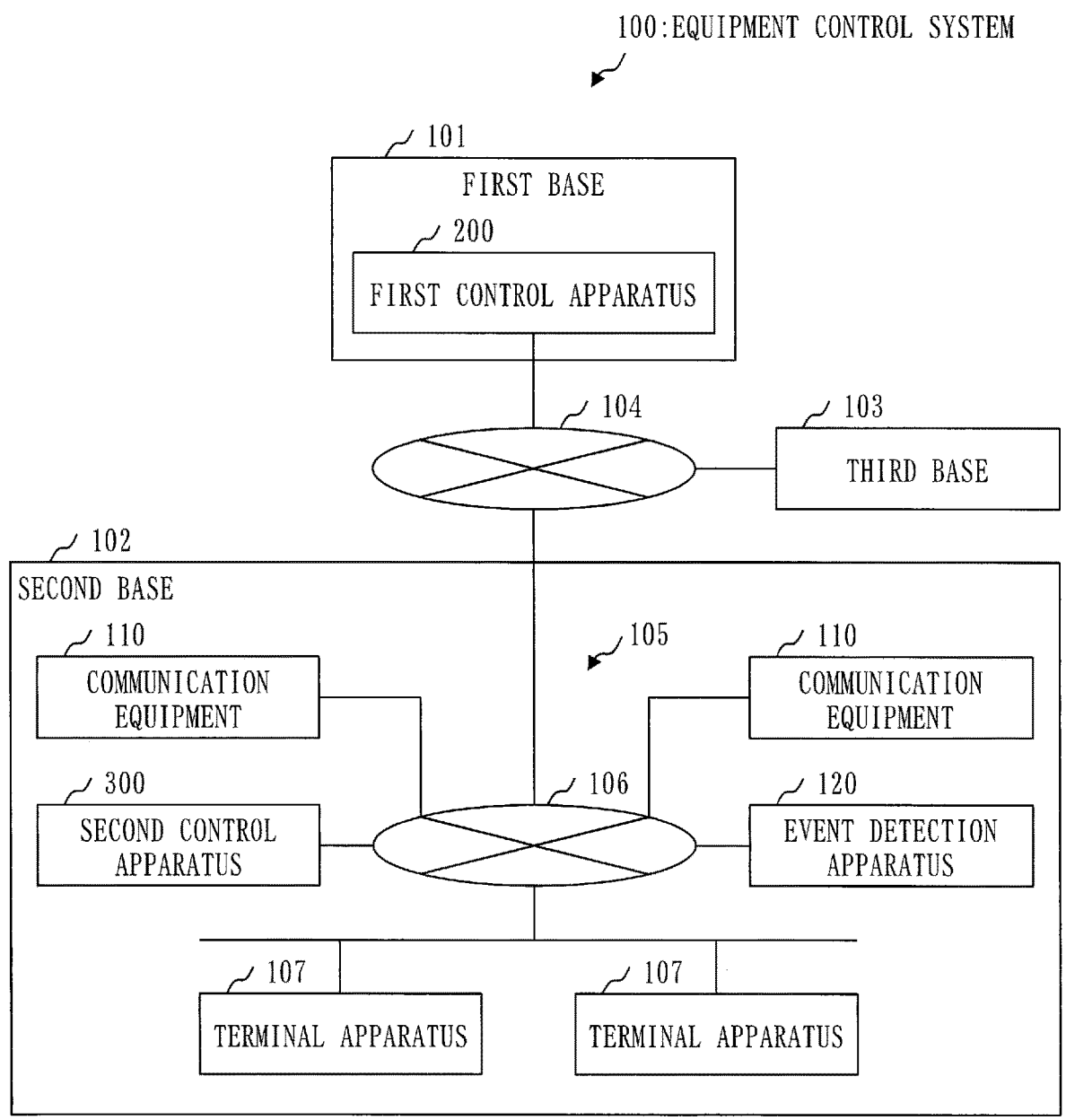
FIG. 1 is a configuration diagram of an equipment control system 100 in a first embodiment.

An equipment control system 100 to control equipment will be described, based on FIGS. 1 to 7.
*Description of Configuration*
A configuration of the equipment control system 100 will be described, based on FIG. 1.

The equipment control system 100 is a system to control the equipment.

Specifically, the equipment control system 100 is a system to perform concentrated control of each piece of communication equipment 110 in each base. Such a system is referred to as a network control system.

The equipment control system 100 includes a plurality of bases.

A first base 101 includes a first control apparatus 200. Specifically, the first control apparatus 200 is an apparatus to perform concentrated control of each piece of communication equipment 110 in the other bases. Such an apparatus is referred to as a network control apparatus.

The first control apparatus 200 is connected to the other bases through a first network 104. Specifically, the first network 104 is a wide area network such as the Internet.

A network system 105 is constructed in a second base 102.

The network system 105 includes a second apparatus 300, an event detection apparatus 120, pieces of communication equipment 110, and terminal apparatuses 107.

These are connected to a second network 106.

Specifically, the second network 106 is a private network. The private network is also referred to as a LAN (Local Area Network).

The second control apparatus 300 is an apparatus to control each piece of communication equipment 110 in the base. Such an apparatus is referred to as a subnetwork control system.

The event detection apparatus 120 is an apparatus to detect an event that has occurred in the network system 105. A specific event is a viral infection of one of the terminal apparatuses 107. A virus means a computer virus.

The communication equipment 110 is a relay apparatus such as a router.

The terminal apparatus 107 is a computer such as a personal computer.

A third base 103 has the same configuration as the second base 102.

The equipment control system 100, however, does not need to include the third base 103. Alternatively, the equipment control system 100 may include another base, in addition to the third base 103. The another base has the same configuration as the second base 102.

Figure 2:
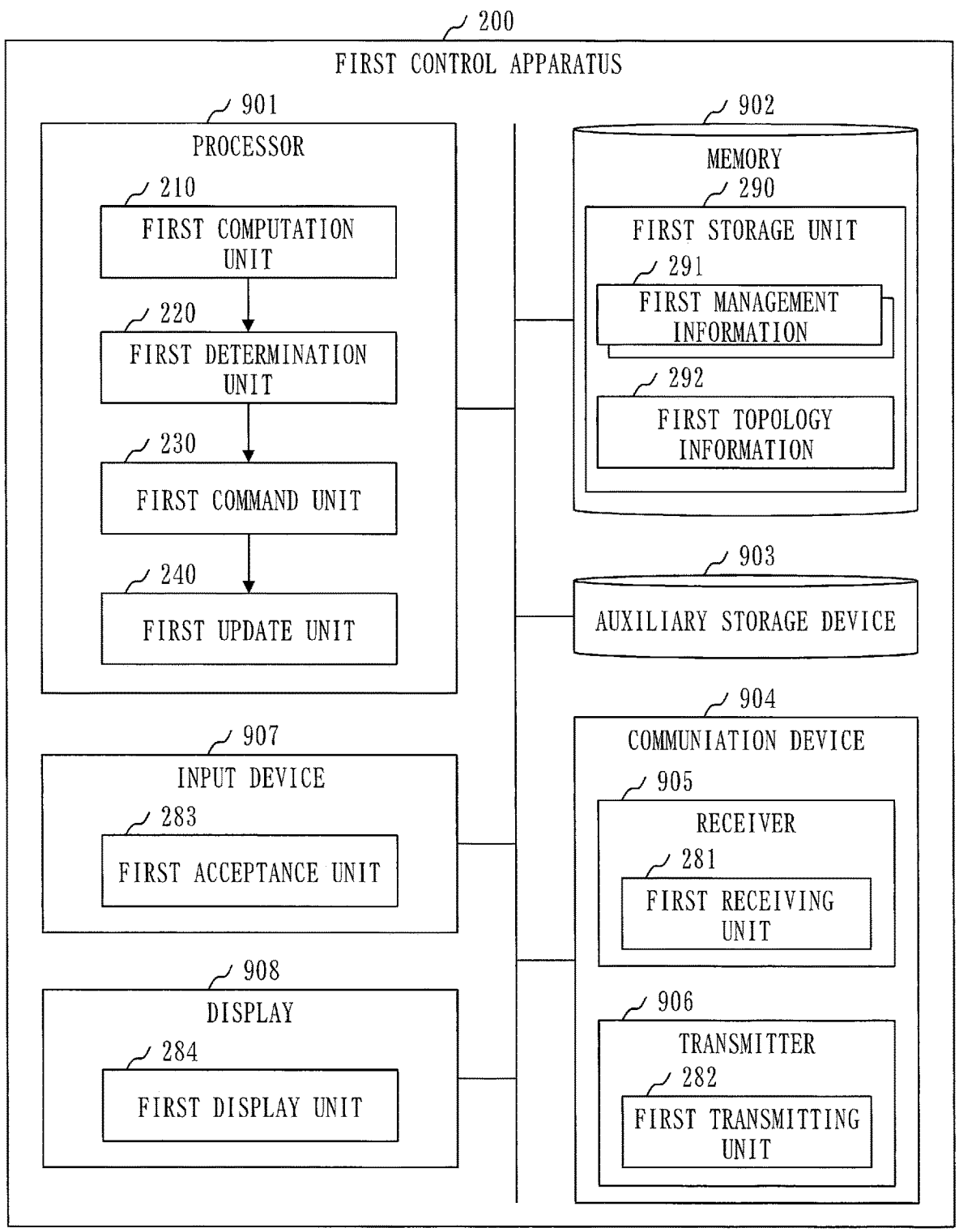
FIG. 2 is a configuration diagram of a first control apparatus 200 in the first embodiment.

A configuration of the first control apparatus 200 will be described, based on FIG. 2.

The first control apparatus 200 is a computer including hardware such as a processor 901, a memory 902, an auxiliary storage device 903, a communication device 904, an input device 907, and a display 908. The processor 901 is connected to the other hardware via a signal line.

The processor 901 is an IC (Integrated Circuit) to perform processing, and controls the other hardware. Specifically, the processor 901 is a CPU, a DSP, or a GPU. The CPU is an abbreviation for Central Processing Unit, the DSP is an abbreviation for Digital Signal Processor, and the GPU is an abbreviation for Graphics Processing Unit.

The memory 902 is a volatile storage device. The memory 902 is also referred to as a main storage device or a main memory. Specifically, the memory 902 is a RAM (Random Access Memory).

The auxiliary storage device 903 is a non-volatile storage device. Specifically, the auxiliary storage device 903 is a ROM, an HDD, or a flash memory. The ROM is an abbreviation for Read Only Memory, and the HDD is an abbreviation for Hard Disk Drive.

The communication device 904 is a device to perform communication, and includes a receiver 905 and a transmitter 906. Specifically, the communication device 904 is a communication chip or an NIC (Network Interface Card).

The input device 907 is a device to receive an input. Specifically, the input device 907 is a keyboard, a mouse, a ten-key, or a touch panel.

The display 908 is a display device to display data. Specifically, the display 908 is a liquid crystal display.

The first control apparatus 200 includes "units" such as a first computation unit 210, a first determination unit 220, a first command unit 230 and a first update unit 240, as functional components. A function of each "unit" is implemented by software. The function of each "unit" will be described later.

A program to implement the function of each "unit" is stored in the auxiliary storage device 903. The program to implement the function of each "unit" is loaded into the memory 902 and is executed by the processor 901.

Further, an OS (Operating System) is stored in the auxiliary storage device 903. At least a part of the OS is loaded into the memory 902 and is executed by the processor 901.

In other words, the processor 901 executes the program to implement the function of each "unit" while executing the OS.

Data to be obtained by the execution of the program that implements the function of each "unit" is stored in a storage device such as the memory 902, the auxiliary storage device 903, a register in the processor 901 or a cache memory in the processor 901. These storage devices each function as a first storage unit 290 to store the data.

The first control apparatus 200 may include a plurality of the processors 901, and the plurality of the processors 901 may cooperate and execute the program to implement the function of each "unit".

Data that are used, generated, input or output, or transmitted or received by the first control apparatus 200 are stored in the memory 902.

Specifically, first management information 291, first topology information 292, and so on are stored in the memory 902. Contents of the data to be stored in the memory 902 will be described later.

The communication device 904 functions as a communication unit to perform data communication, the receiver 905 functions as a first receiving unit 281 to perform data reception, and the transmitter 906 functions as a first transmitting unit 282 to perform data transmission.

The input device 907 functions a first acceptance unit 283 to accept an input.

The display 908 functions as a first display unit 284 to perform data display.

Hardware bringing together the processor 901, the memory 902, and the auxiliary storage device 903 is referred to as "processing circuitry".

Each "unit" may be read as a "process" or a "step". The function of each "unit" may be implemented by firmware.

The program to implement the function of each "unit" can be stored in a non-volatile storage medium such as a magnetic disk, an optical disk, or a flash memory.

Figure 3:
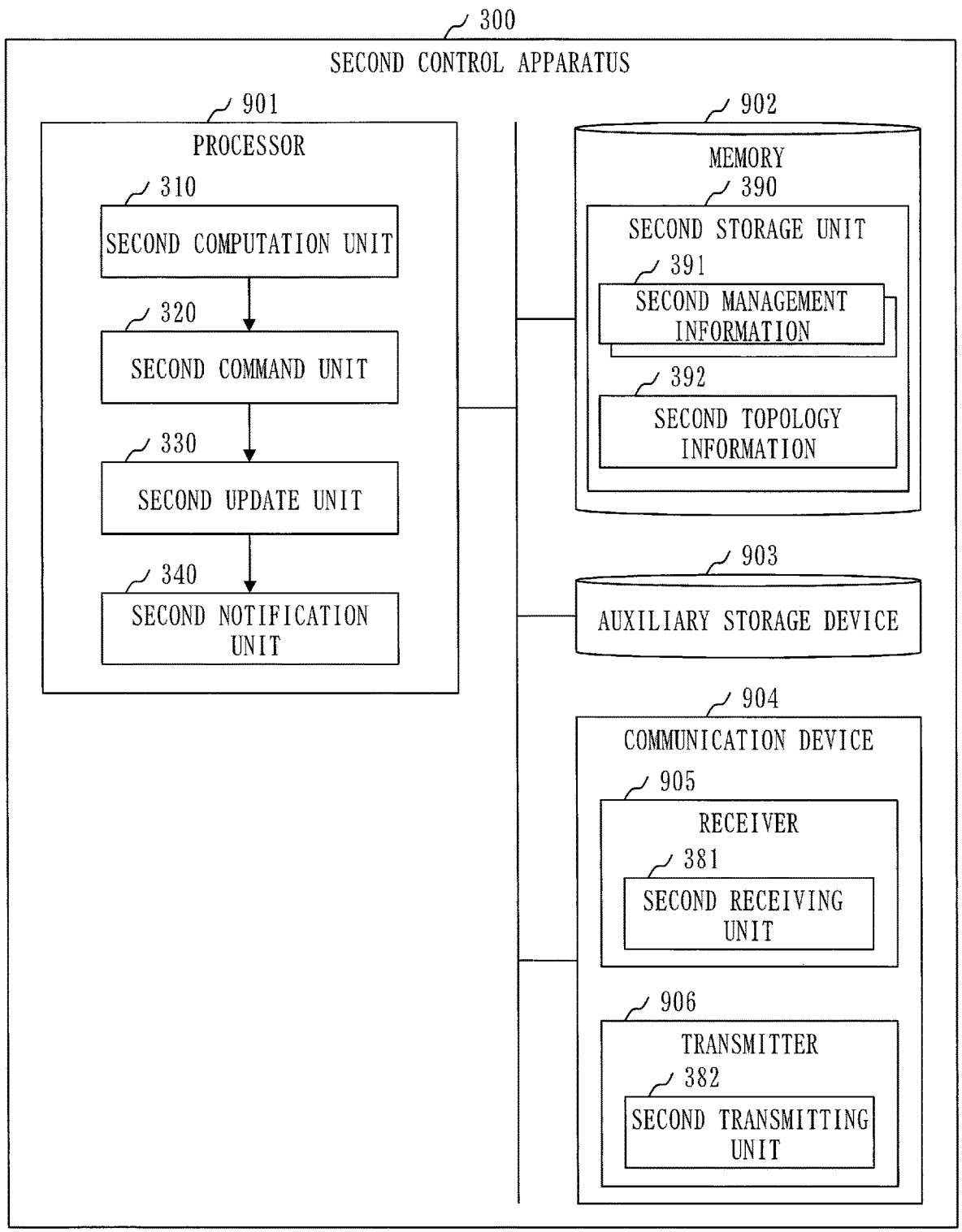
FIG. 3 is a configuration diagram of a second control apparatus 300 in the first embodiment.

A configuration of the second control apparatus 300 will be described, based on FIG. 3.

The second control apparatus 300 is a computer including hardware such as a processor 901, a memory 902, an auxiliary storage device 903, and a communication device 904. The processor 901 is connected to the other hardware via a signal line.

The second control apparatus 300 includes "units" such as a second computation unit 310, a second command unit 320, a second update unit 330, and a second notification unit 340, as functional components. A function of each "unit" is implemented by software. The function of each "unit" will be described later.

The second control apparatus 300 may include a plurality of the processors 901, and the plurality of the processors 901 may cooperate and execute the program to implement the function of each "unit".

Data that are used, generated, input or output, or transmitted or received by the second control apparatus 300 are stored in the memory 902.

Specifically, second management information 391, second topology information 392, and so on are stored in the memory 902. Contents of the data to be stored in the memory 902 will be described later.

The communication device 904 functions as a communication unit to perform data communication, a receiver 905 functions as a second receiving unit 381 to perform data reception, and a transmitter 906 functions as a second transmitting unit 382 to perform data transmission.

A storage device such as the memory 902, the auxiliary storage device 903, a register in the processor 901 or a cache memory in the processor 901 functions as a second storage unit 390 to perform data storage.

*Description of Operations*

Operations of each of the first control apparatus 200 and the second control apparatus 300 correspond to an equipment control method. A procedure of the equipment control method corresponds to a procedure of an equipment control program.

Figure 4:
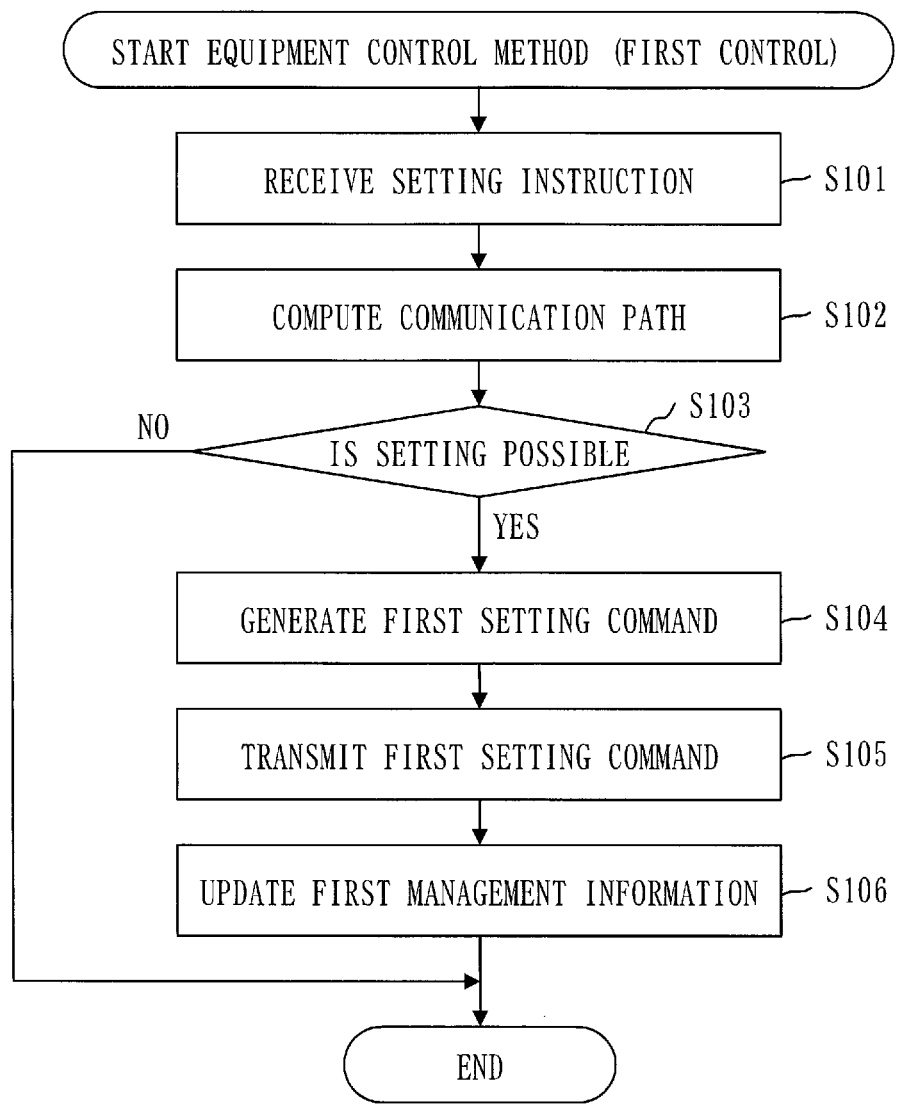
FIG. 4 is a flowchart of an equipment control method (first control) in the first embodiment.

The equipment control method (first control) will be described, based on FIG. 4.

The equipment control method (first control) is executed when a manager operates the input device 907 to input a setting instruction to the first control apparatus 200.

The setting instruction is an instruction for setting of specific communication equipment 110. Contents of the setting according to the setting instruction are referred to as first setting.

In the description of the equipment control method (first control), the specific communication equipment 110 is just referred to as the communication equipment 110.

Step S101 is a first acceptance process.

In step S101, the first acceptance unit 283 accepts a setting instruction.

Step S102 is a first computation process.

In step S102, the first computation unit 210 computes a communication path, based on the setting instruction.

The communication path is computed, according to a computation algorithm. The computation algorithm is generated by the manager and is stored in the first storage unit 290 in advance.

Specifically, the first computation unit 210 computes the communication path associated with the setting instruction, using the first topology information 292.

The first topology information 292 is information for managing the topology of the second network 106.

If the setting instruction is an instruction for allowing communication from the terminal apparatus 107 to the first network 104, the first computation unit 210 computes a shortest path to the relay apparatus connected to the first network 104 from the terminal apparatus 107.

Step S103 is a first determination process.

In step S103, the first determination unit 220 determines possibility or impossibility of the first setting, based on the first management information 291.

The first management information 291 is information for managing setting of the communication equipment 110. Specifically, the first management information 291 is a setting command transmitted to the communication equipment 110 for changing the setting of the communication equipment 110.

The determination by the first determination unit 220 is as follows.

The first determination unit 220 determines whether the communication path that has been computed is in contradiction with the first management information 291. The contradiction means that contents of the communication path and the first management information 291 are contrary to each other.

If the contents of the first management information 291 are setting for making it impossible to perform communication from the terminal apparatus 107 to the first network 104 and the contents of the communication path are a path for making it possible to perform the communication from the terminal apparatus 107 to the first network 104, the communication path is in contradiction with the first management information 291.

Presence or absence of the contradiction is determined, according to a determination algorithm. The determination algorithm is generated by the manager and is stored in the first storage unit 290 in advance.

If there is no contradiction, the first determination unit 220 determines that the first setting is possible. If there is the contradiction, the first determination unit 220 determines that the first setting is impossible.

If the first setting has been determined to be possible, the procedure proceeds to step S104.

If the first setting has been determined to be impossible, the setting of the communication equipment 110 is not changed to the first setting, and the procedure of the equipment control method (first control) is finished.

Step S104 is a first command process.

In step S104, the first command unit 230 generates a first setting command for making the setting of the communication equipment 110 the first setting.

Specifically, the first command unit 230 converts the computed communication path into the first setting command. The conversion from the computed communication path into the first setting command is performed according to a conversion algorithm. The conversion algorithm is generated by the manager and is stored in the first storage unit 290 in advance.

If the contents of the communication path are the ones indicating that data in the terminal apparatus 107 is forwarded from a first port to a second port of the communication equipment 110, the first command unit 230 converts the communication path into a command for the port of the communication equipment 110.

Step S105 is a first transmission process.

In step S105, the first transmitting unit 282 transmits the first setting command.

Specifically, the first transmitting unit 282 transmits a packet including the first setting command to the communication equipment 110. This packet reaches the communication equipment 110 via the first network 104 and the second network 106.

When the communication equipment 110 receives the first setting command, the communication equipment 110 updates the setting of its own to the first setting.

Step S106 is a first update process.

In step S106, the first update unit 240 updates the first management information 291 to information associated with the first setting.

Specifically, the first update unit 240 updates the first management information 291 to the first setting command.

By the processes from step S101 to step S106, the setting of the communication equipment 110 is changed to the first setting, and the first management information 291 is updated to the information associated with the first setting.

The equipment control method (second control) will be described, based on FIG. 5.

The equipment control method (second control) is executed when the event detection apparatus 120 detects an event that has occurred in the network system 105 and an event notification is transmitted from the event detection apparatus 120 to the second control apparatus 300. The event notification is a notification for informing the event that has been detected.

A specific event is detection of a virus. When data having a specific pattern is flowing in the second network 106, the virus is detected by the event detection apparatus 120.

Step S111 is a second reception process.

In step S111, the second receiving unit 381 receives the event notification. Specifically, the second receiving unit 381 receives a packet including the event notification.

Step S112 is a second computation process.

In step S112, the second computation unit 310 computes a communication path, based on the event notified by the event notification.

The communication path is computed by a computation algorithm. The computation algorithm is generated by the manager, and is stored in the second storage unit 390 in advance.

Specifically, the second computation unit 310 computes the communication path associated with the event, using the second topology information 392.

The second topology information 392 is information for managing the topology of the second network 106.

When the event is a virus infection of the terminal apparatus 107, the second computation unit 310 computes the communication path whereby communication from the terminal apparatus 107 to the first network 104 is blocked.

Step S113 is a second command process.

In step S113, the second command unit 320 generates a second setting command, according to the event that has occurred in the network system 105. The second setting command is a command for making the setting of specific communication equipment 110 second setting. In the description of the equipment control method (second control), the specific communication equipment 110 is just referred to as the communication equipment 110.

Specifically, the second command unit 320 converts the communication path that has been computed into the second setting command. The method of the conversion is the same as that in step S104. That is, the second command unit 320 performs the conversion according to a conversion algorithm stored in the second storage unit 390 in advance.

Step S114 is a second transmission process.

In step S114, the second transmitting unit 382 transmits the second setting command.

Specifically, the second transmitting unit 382 transmits a packet including the second setting command to the communication equipment 110. This packet reaches the communication equipment 110 via the second network 106.

When the communication equipment 110 receives the second setting command, the communication equipment 110 updates the setting of its own to the second setting.

Step S115 is a second update process.

In step S115, the second update unit 330 updates the second management information 391 to information associated with the second setting. The second management information 391 is information for managing the setting of the communication equipment 110.

Specifically, the second update unit 330 updates the second management information 391 to the second setting command.

Step S116 is a second notification process.

In step S116, the second notification unit 340 generates a second setting notification. The second setting notification is a notification for informing the second setting.

Specifically, the second setting notification is information including the second setting command.

Step S117 is a second transmission process.

In step S117, the second transmitting unit 382 transmits the second setting notification to the first control apparatus 200.

Specifically, the second transmitting unit 382 transmits a packet including the second setting notification to the first control apparatus 200. This packet reaches the first control apparatus 200 via the second network 106 and the first network 104.

Step S120 is a notification update process.

In step S120, the first management information 291 of the first control apparatus 200 is updated to the information associated with the second setting.

The notification update process (S120) will be described, based on FIG. 6.

Step S121 is a first reception process.

In step S121, the first receiving unit 281 receives the second setting notification.

Specifically, the first receiving unit 281 receives the packet including the second setting notification.

Step S122 is a first update process.

In step S122, the first update unit 240 updates the first management information 291 to the information associated with the second setting.

Specifically, the first update unit 240 updates the first management information 291 to the second setting command.

By the processes from step S111 to step S122, the setting of the communication equipment 110 is changed to the second setting, and the first management information 291 and the second management information 391 are updated to the information associated with the second setting command.

Figure 7:
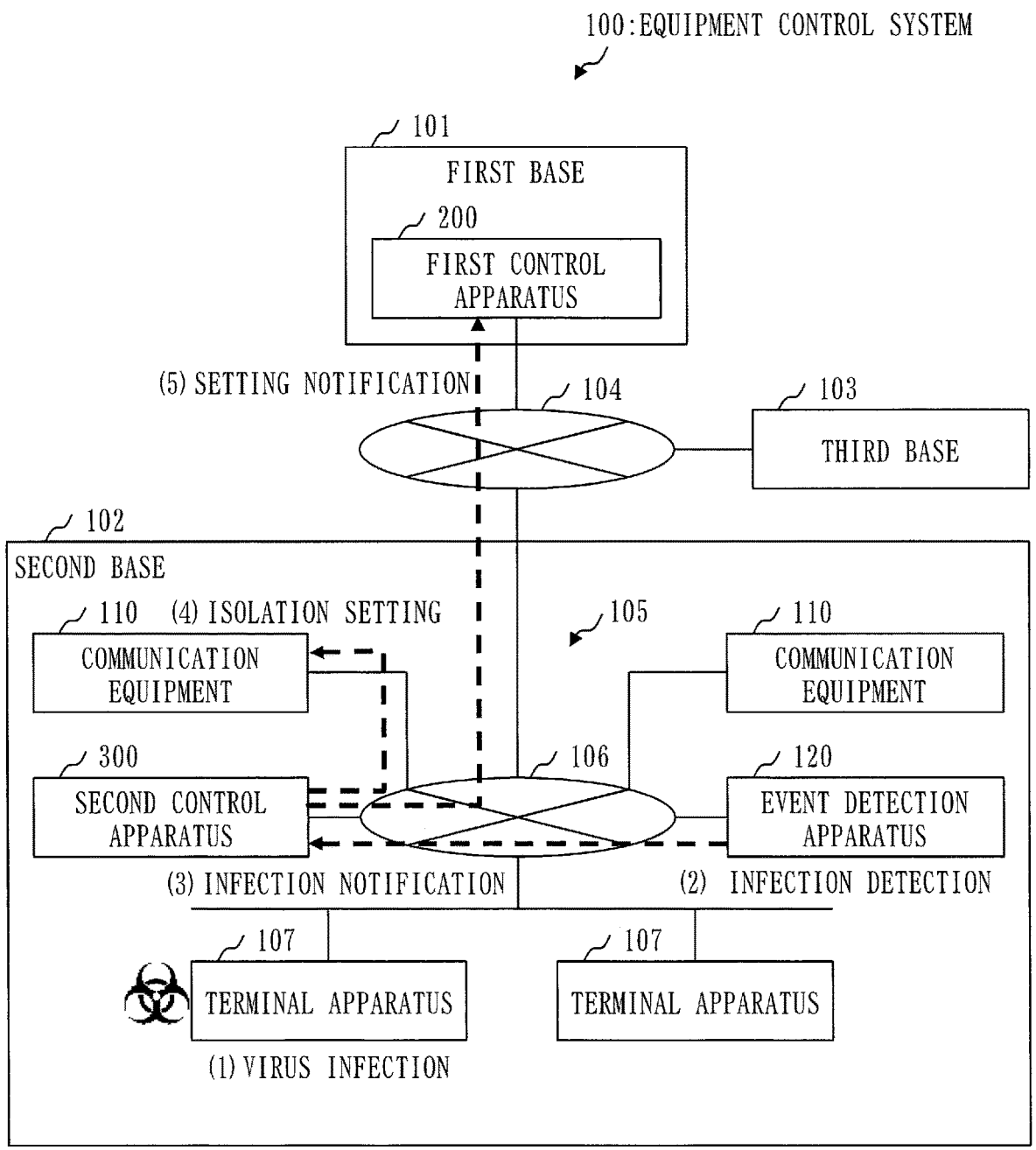
FIG. 7 is a diagram illustrating a specific example of operations of the equipment control system 100 in the first embodiment.

A specific example of operations of the equipment control system 100 in the first embodiment will be described, based on FIG. 7.

(1) The terminal apparatus 107 is infected with a virus.

(2) The event detection apparatus 120 monitors communication state of the terminal apparatus 107 and detects the virus infection of the terminal apparatus 107.

(3) The event detection apparatus 120 notifies the virus infection of the terminal apparatus 107 to the second control apparatus 300.

(4) The second control apparatus 300 performs, for the communication equipment 110, setting for isolating the terminal apparatus 107 infected with the virus from the second network 106.

(5) The second control apparatus 300 notifies contents of the setting for the communication equipment 110 to the first control apparatus 200.

Effects of First Embodiment

The second control apparatus 300 is disposed in the second base 102, and an event is notified from the event detection apparatus 120 to the second control apparatus 300. Then, the second control apparatus 300 performs setting associated with the event, for the communication equipment 110 in the second network 106. This can quickly control the communication equipment 110 in the second network 106. That is, the second network 106 can be quickly controlled.

Further, since control over the communication equipment 110 is performed in the second base 102, the communication equipment 110 can be controlled even in a situation where the first control apparatus 200 cannot communicate with the communication equipment 110. That is, the second network 106 can be controlled.

When a computer virus is detected, the second network 106 is controlled with reliability and quickness, thereby isolating traffic of the terminal apparatus 107 infected with the computer virus from the second network 106. Accordingly, security can be improved.

*Alternative Configuration*

The management information (291, 391) is set by the manager.

The management information may, however, be collected by each piece of communication equipment 110.

The topology information (292, 392) is set by the manager.

The topology information may, however, be collected by each piece of communication equipment 110. In this case, each piece of communication equipment 110 detects a piece of communication equipment 110 adjacent thereto. Then, the control apparatuses (200, 300) collect from the communication equipment 110, information identifying the communication equipment 110 that has been detected, and stores the collected information as the topology information.

A setting instruction may be transmitted from the terminal apparatus 107 to the first control apparatus 200. In this case, the first receiving unit 281 functions as the first acceptance unit 283.

Second Embodiment

A description will be given about an embodiment where first setting is performed for communication equipment 110 via a second control apparatus 300, based on FIGS. 8 to 11. What has been described in the first embodiment will, however, be omitted or simplified.

*Description of Configuration*

Configurations of an equipment control system 100 and a first control apparatus 200 are the same as those in the first embodiment.

Figure 8:
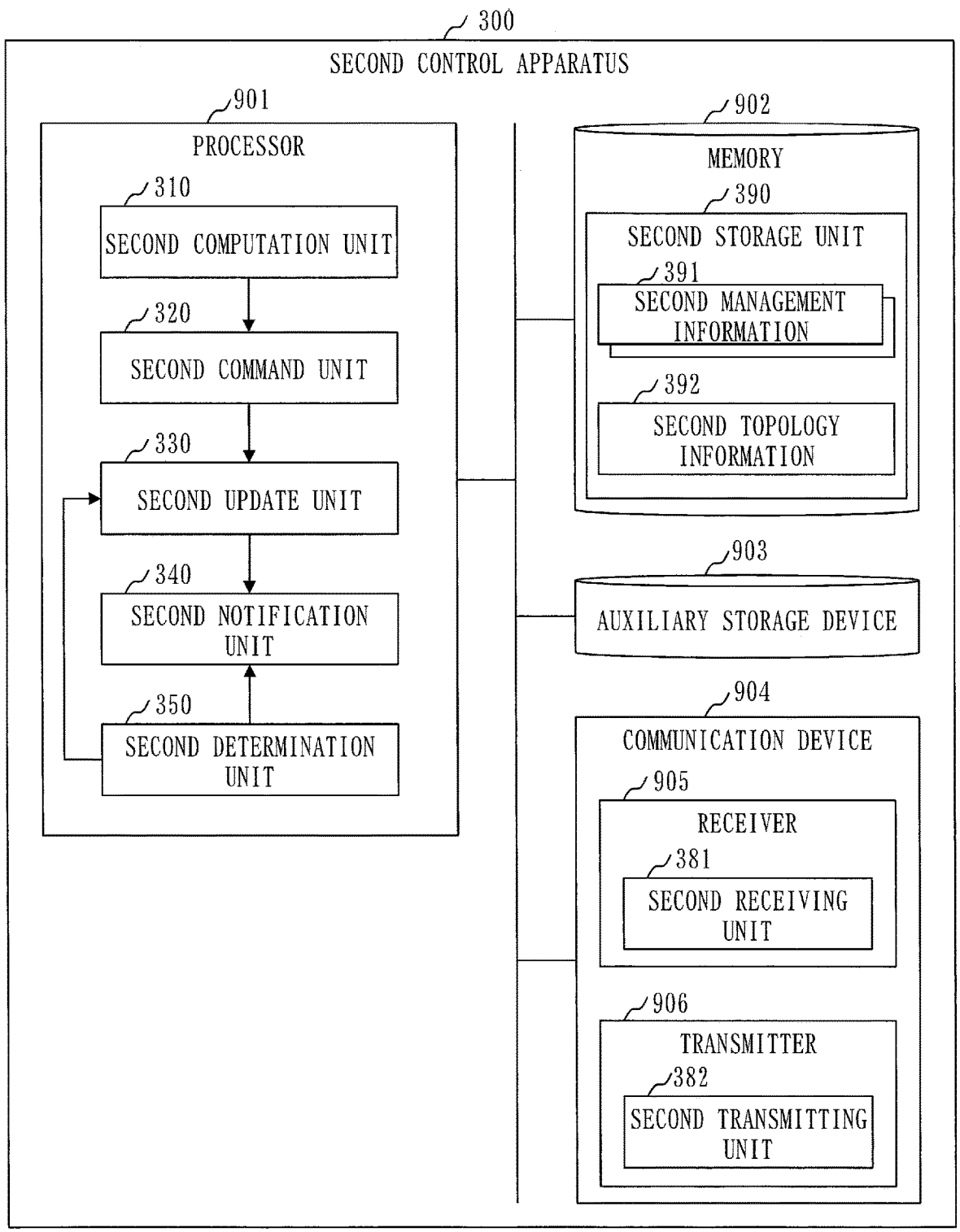
FIG. 8 is a configuration diagram of a second control apparatus 300 in a second embodiment.

A configuration of the second control apparatus 300 will be described, based on FIG. 8.

In addition to the components described in the first embodiment, the second control apparatus 300 includes a second determination unit 350 as a functional component.

A function of the second determination unit 350 will be described later.

*Description of Operations*

Figure 9:
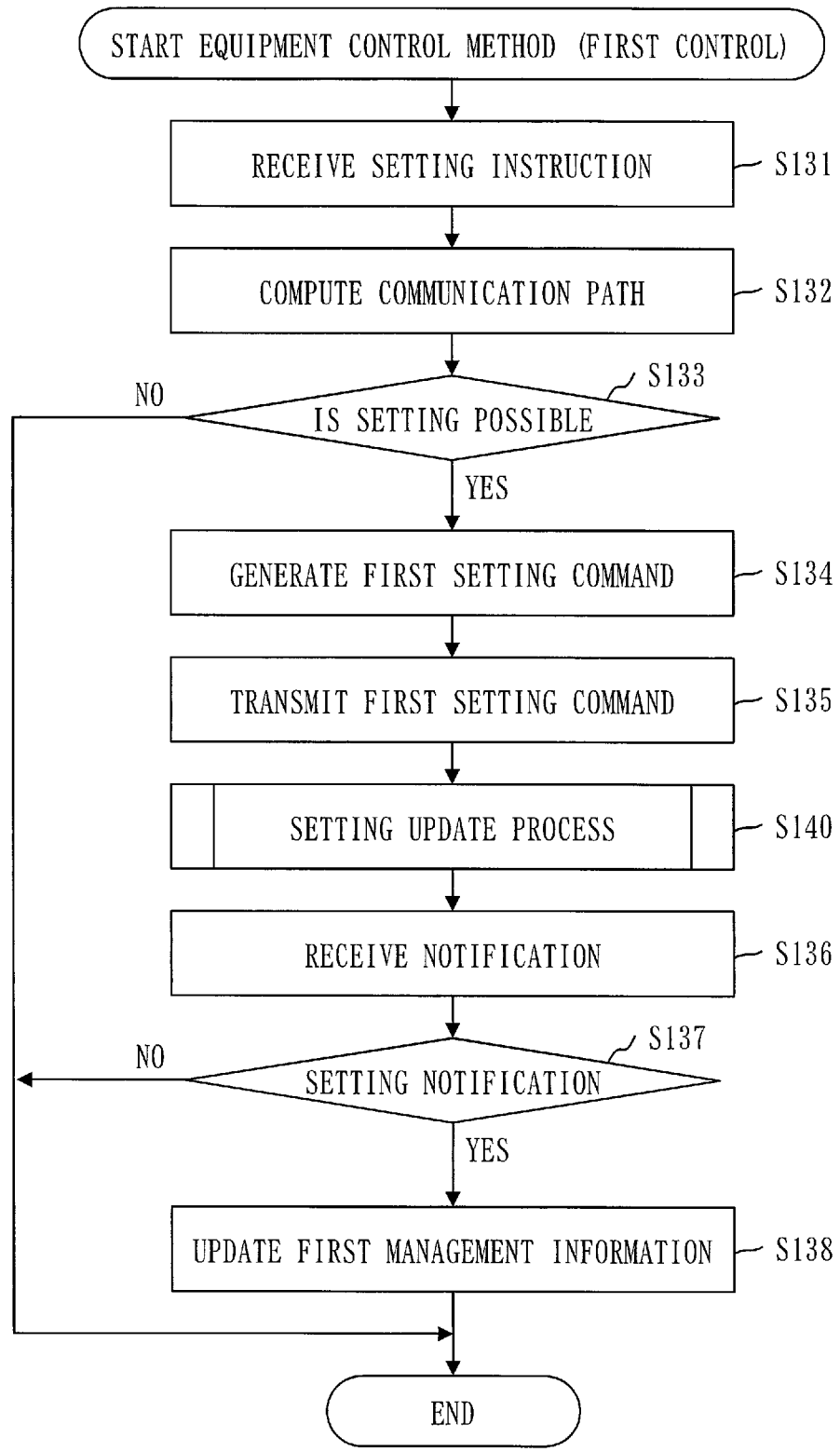
FIG. 9 is a flowchart of an equipment control method (first control) in the second embodiment.

An equipment control method (first control) will be described, based on FIG. 9.

Processes from step S131 to step S134 are the same as the processes from the step S101 to the step S104 described in the first embodiment.

Step S135 is a first transmission process.

In step S135, a first transmitting unit 282 transmits a first setting command.

Specifically, the first transmitting unit 282 transmits a packet including the first setting command to the second control apparatus 300. This packet reaches the second control apparatus 300 via a first network 104 and a second network 106.

Step 140 is a setting update process.

In step S140, a first setting notification or an error notification is transmitted from the second control apparatus 300 to the first control apparatus 200.

The first setting notification is a notification for informing first setting.

The error notification is a notification for informing an error.

Details of the setting update process (S140) will be described later.

Step S136 is a first reception process.

In step S136, a first receiving unit 281 receives the first setting notification or the error notification.

Specifically, the first receiving unit 281 receives a packet including the first setting notification or a packet including the error notification.

Step S137 and step S138 constitute a first update process.

In step S137, a first update unit 240 determines whether the received notification is one of the first setting notification and the error notification.

If the received notification is the first setting notification, the procedure proceeds to step S138.

If the received notification is the error notification, the procedure of the equipment control method (first control) is finished with setting of the communication equipment 110 not changed to the first setting.

Step S138 is the same as step S106 described in the first embodiment.

The setting update process (S140) will be described, based on FIG. 10.

Step S141 is a second reception process.

In step S141, a second receiving unit 381 receives the first setting command.

Specifically, the second receiving unit 381 receives the packet including the first setting command.

Step S142 is a second determination process.

In step S142, the second determination unit 350 determines possibility or impossibility of the first setting, based on second management information 391. The method of the determination is the same as step S103 described in the first embodiment based on FIG. 4.

If the first setting has been determined to be possible, the procedure proceeds to step S143.

If the first setting has been determined to be impossible, the procedure proceeds to step S147.

Step S143 is a second transmission process.

In step S143, the second receiving unit 381 transmits the first setting command.

Specifically, the second receiving unit 381 transmits the packet including the first setting command to the communication equipment 110. This packet reaches the communication equipment 110 via the second network 106.

When the communication equipment 110 receives the first setting command, the communication equipment 110 updates the setting of its own to the first setting.

Step S144 is a second update process.

In step S144, a second update unit 330 updates the second management information 391 to information associated with the first setting.

Specifically, the second update unit 330 updates the second management information 391 to the first setting command.

Step S145 is a first notification process.

In step S145, a second notification unit 340 generates the first setting notification.

Specifically, the first setting notification is information including the first setting command.

Step S146 is a second transmission process.

In step S146, a second transmitting unit 382 transmits the first setting notification to the first control apparatus 200.

Specifically, the second transmitting unit 382 transmits the packet including the first setting notification to the first control apparatus 200. This packet reaches the first control apparatus 200 via the second network 106 and the first network 104.

Step 147 is an error notification process.

In step S147, the second notification unit 340 generates the error notification.

Step S148 is a second transmission process.

In step S148, the second transmitting unit 382 transmits the error notification to the first control apparatus 200.

Specifically, the second transmitting unit 382 transmits the packet including the error notification to the first control apparatus 200. This packet reaches the first control apparatus 200 via the second network 106 and the first network 104.

An equipment control method (second control) is the same as that in the first embodiment.

Figure 11:
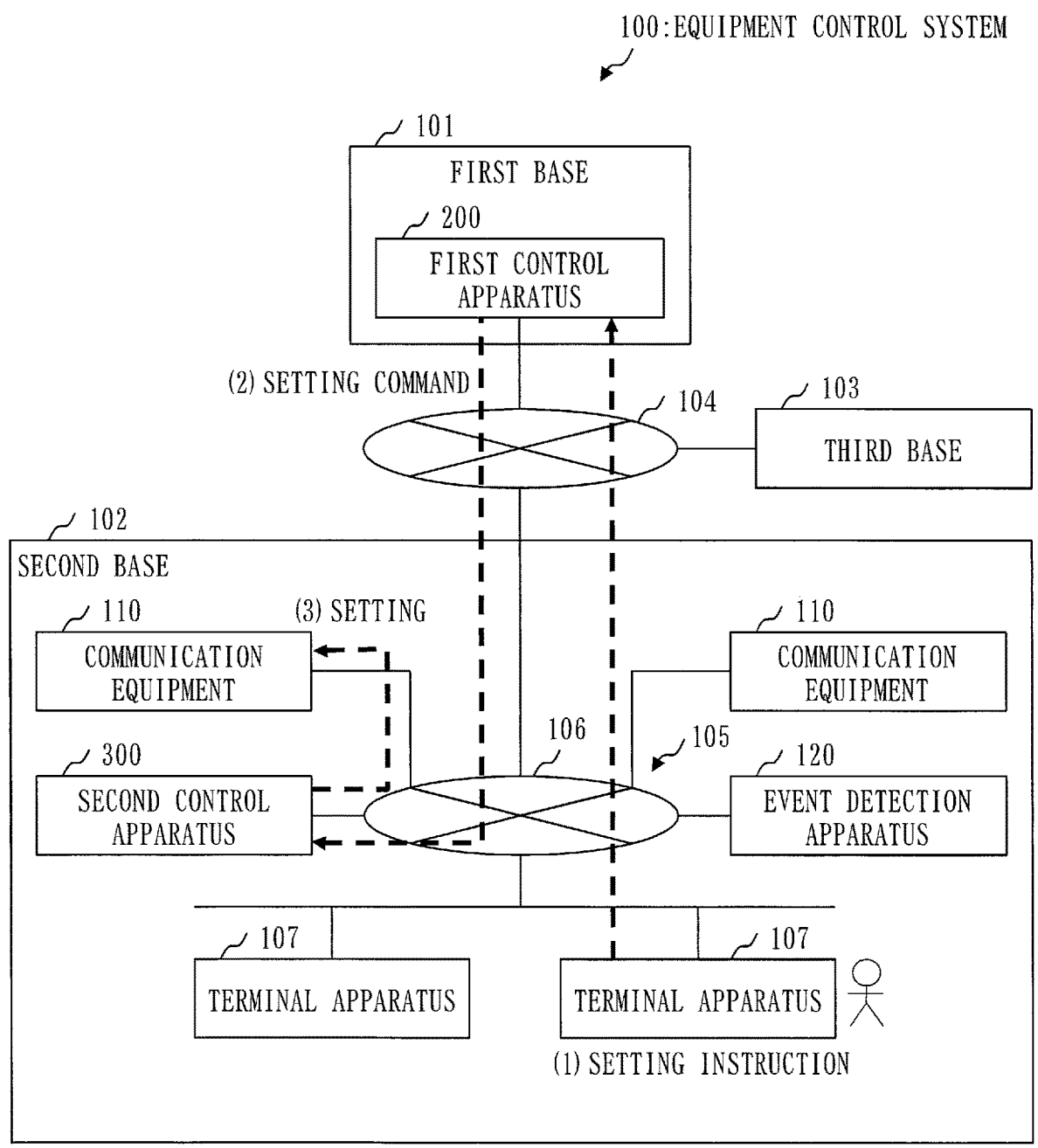
FIG. 11 is a diagram illustrating a specific example of operations of an equipment control system 100 in the second embodiment.

A specific example of operations of the equipment control system 100 in the second embodiment will be described based on FIG. 11.

(1) A manager instructs the first control apparatus 200 to perform the first setting using a terminal apparatus 107.

(2) The first control apparatus 200 transmits the first setting command to the second control apparatus 300.

(3) The second control apparatus 300 performs the first setting for the communication equipment 110.

Effect of Second Embodiment

When the communication equipment 110 in the second network 106 is controlled from the first control apparatus 200, the communication equipment 110 is controlled via the second control apparatus 300. This can prevent generation of contradiction between first management information 291 of the first control apparatus 200 and the second management information 391 of the second control apparatus 300.

Third Embodiment

Based on FIGS. 12 to 17, a description will be given about an embodiment where necessity or nonnecessity of setting is determined based on the priority of the setting. What has been described in the first embodiment or the second embodiment will, however, be omitted or simplified.

*Description of Configuration*

A configuration of an equipment control system 100 is the same as that in the first embodiment.

Figure 12:
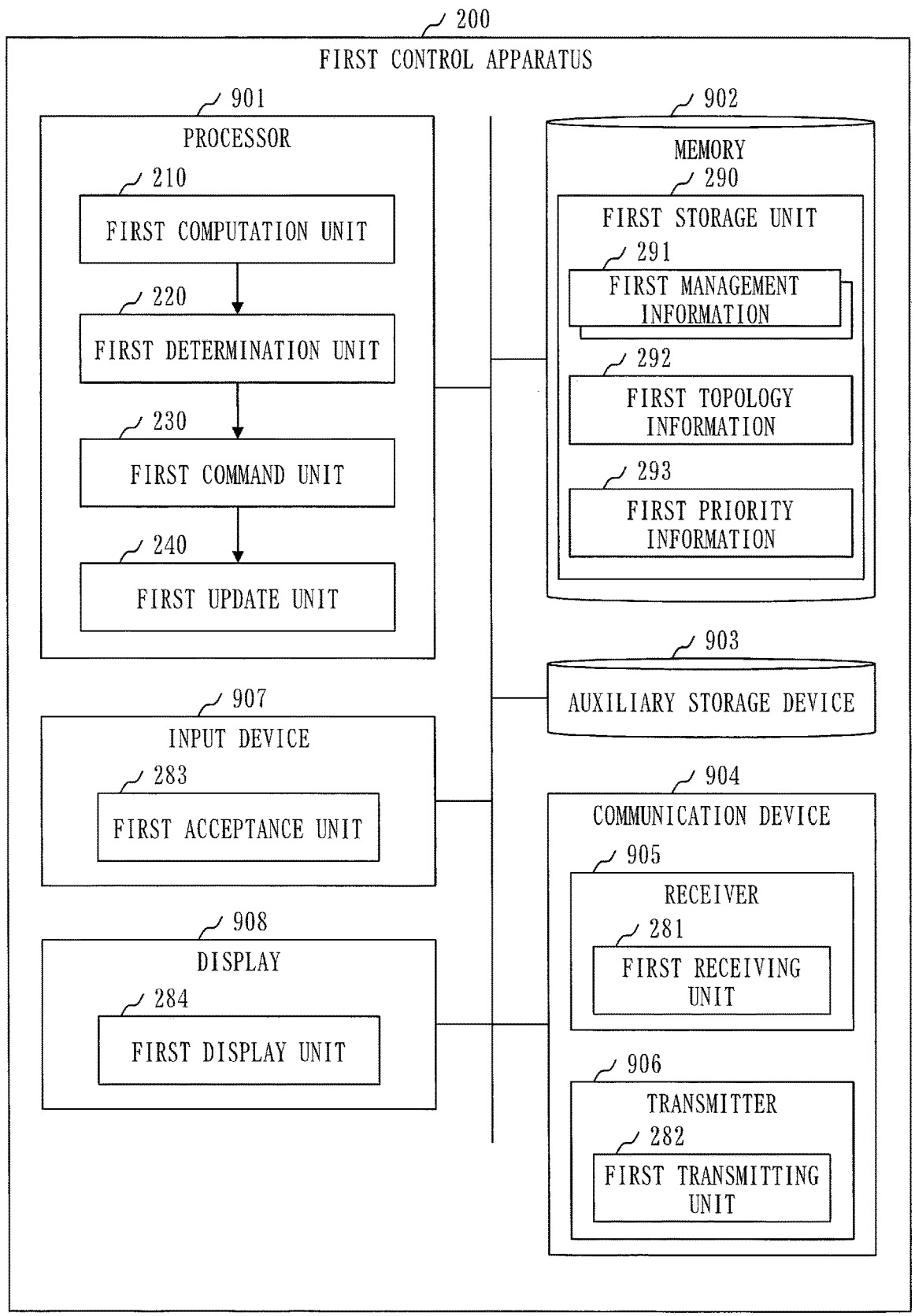
FIG. 12 is a configuration diagram of a first control apparatus 200 in a third embodiment.

A configuration of a first control apparatus 200 will be described, based on FIG. 12.

First management information 291, first priority information 293, and so on are stored in a first storage unit 290.

The first management information 291 includes the priority of setting of the communication equipment 110.

As illustrated in FIG. 13, the first priority information 293 is data in which each priority and a command trigger are associated with each other.

The other components of the first control apparatus 200 are the same as those in the first embodiment.

Figure 14:
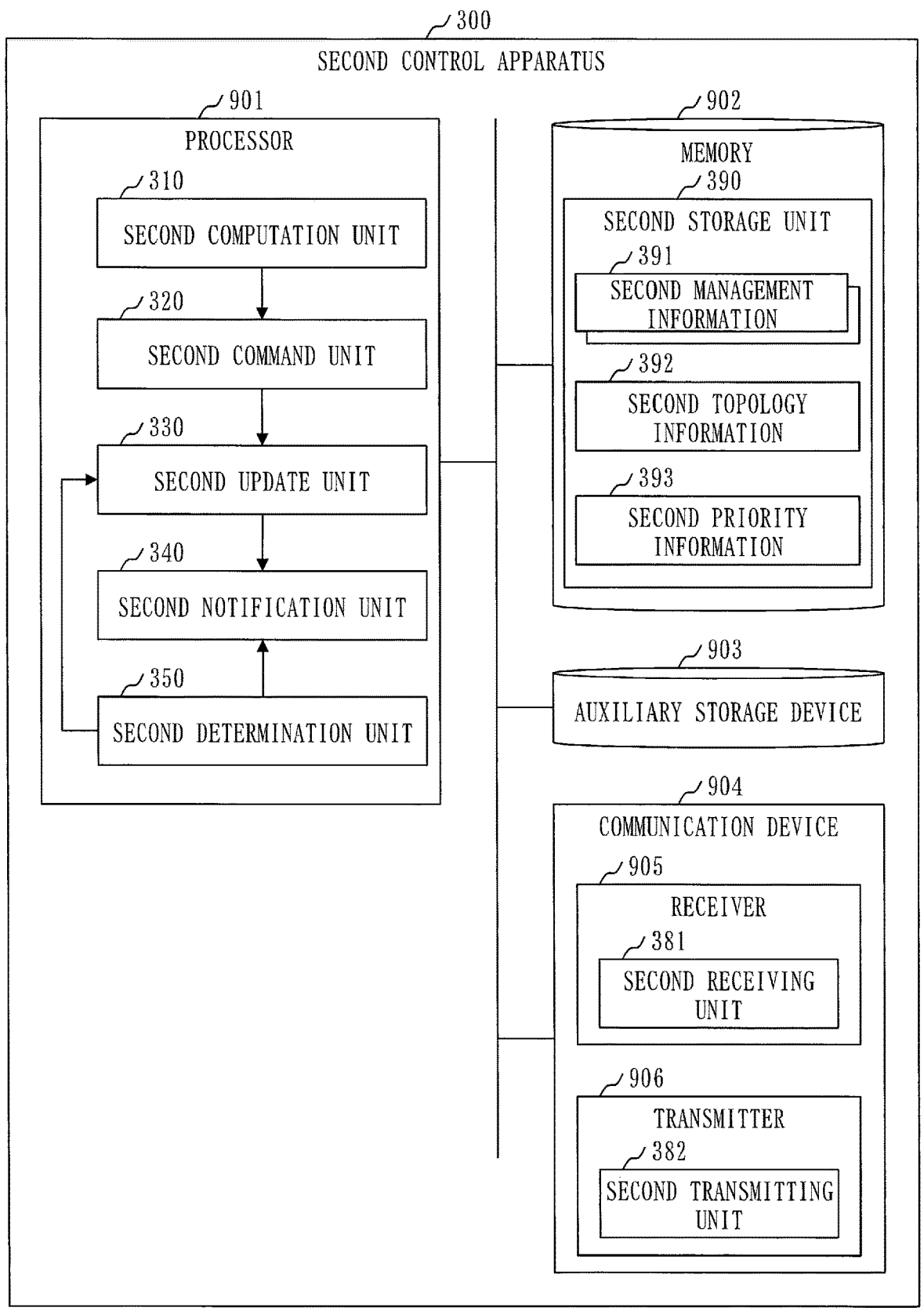
FIG. 14 is a configuration diagram of a second control apparatus 300 in the third embodiment.

A configuration of a second control apparatus 300 will be described, based on FIG. 14.

Second management information 391, second priority information 393, and so on are stored in a second storage unit 390.

The second management information 391 includes the priority of the setting of the communication equipment 110.

The second priority information 393 has the same configuration as the first priority information 293.

*Description of Operations*

An equipment control method (first control) will be described, based on FIGS. 15 and 16.

First, processes from step S151 to step S158 will be described, based on FIG. 15.

The processes from step S151 to step S155 are the same as the processes from step S131 to step S135 described in the second embodiment.

If first setting has been determined to be impossible in step S153, however, the procedure proceeds to step S161.

Step S170 is a setting update process.

In step S170, a first setting notification or an error notification is transmitted from the second control apparatus 300 to the first control apparatus 200.

The first setting notification is a notification for informing the first setting.

The error notification is a notification for informing an error.

Details of the setting update process (S170) will be described later.

Step S156 and step S157 are same as step S136 and step S137 described in the second embodiment.

Step S158 is a first update process.

In step S158, a first update unit 240 acquires, from the first priority information 293, a priority corresponding to the first setting.

Specifically, the first update unit 240 acquires, from the first priority information 293 in FIG. 13, the priority of "2" corresponding to a setting instruction.

Then, the first update unit 240 updates the first management information 291 to information associated with the first setting.

Specifically, the first update unit 240 updates the first management information 291 to a first setting command and the acquired priority.

Subsequently, processes from step S161 to step S166 will be described, based on FIG. 16.

In step S161, a first determination unit 220 acquires, from the first priority information 293, the priority corresponding to the setting instruction.

Then, the first determination unit 220 determines which one of the priority corresponding to the setting instruction and the priority included in the first management information 291 is higher.

If the priority corresponding to the setting instruction is higher, the procedure proceeds to step S162.

If the priority corresponding to the setting instruction is lower, the procedure of the equipment control method (first control) is finished with the setting of the communication equipment 110 not changed to the first setting.

In step S162, the first determination unit 220 inquires about necessity or nonnecessity of the first setting.

Specifically, the first determination unit 220 inputs a message of the inquiry to a first display unit 284, and the first display unit 284 displays the message of the inquiry.

In step S163, a first acceptance unit 283 accepts a determination result indicating the necessity or the nonnecessity of the first setting.

Specifically, a manager determines the necessity or nonnecessity of the first setting, operates an input device 907, and inputs the determination result to the first control apparatus 200. Then, the first acceptance unit 283 accepts the input determination result.

In step S164, the first determination unit 220 determines contents of the accepted determination result.

If the determination result indicating that the first setting is necessary has been accepted, the procedure proceeds to step S165.

If the determination result indicating that the first setting is not necessary has been accepted, the procedure of the equipment control method (first control) is finished with the setting of the communication equipment 110 not changed to the first setting.

In step S165, the first command unit 230 generates a first setting command and a priority flag. Contents of the first setting command are the same as the contents described in step S104 in the first embodiment.

The priority flag is a flag to request that priority be given to the first setting rather than the setting of the communication equipment 110.

In step S166, the first transmitting unit 282 transmits the first setting command and the priority flag.

Specifically, the first transmitting unit 282 transmits a packet including the first setting command and the priority flag to the second control apparatus 300. This packet reaches the second control apparatus 300 via a first network 104 and a second network 106.

After step S166, the procedure proceeds to a setting update process (S170).

A description will be given about the setting update process (S170), based on FIG. 17.

Figure 10:
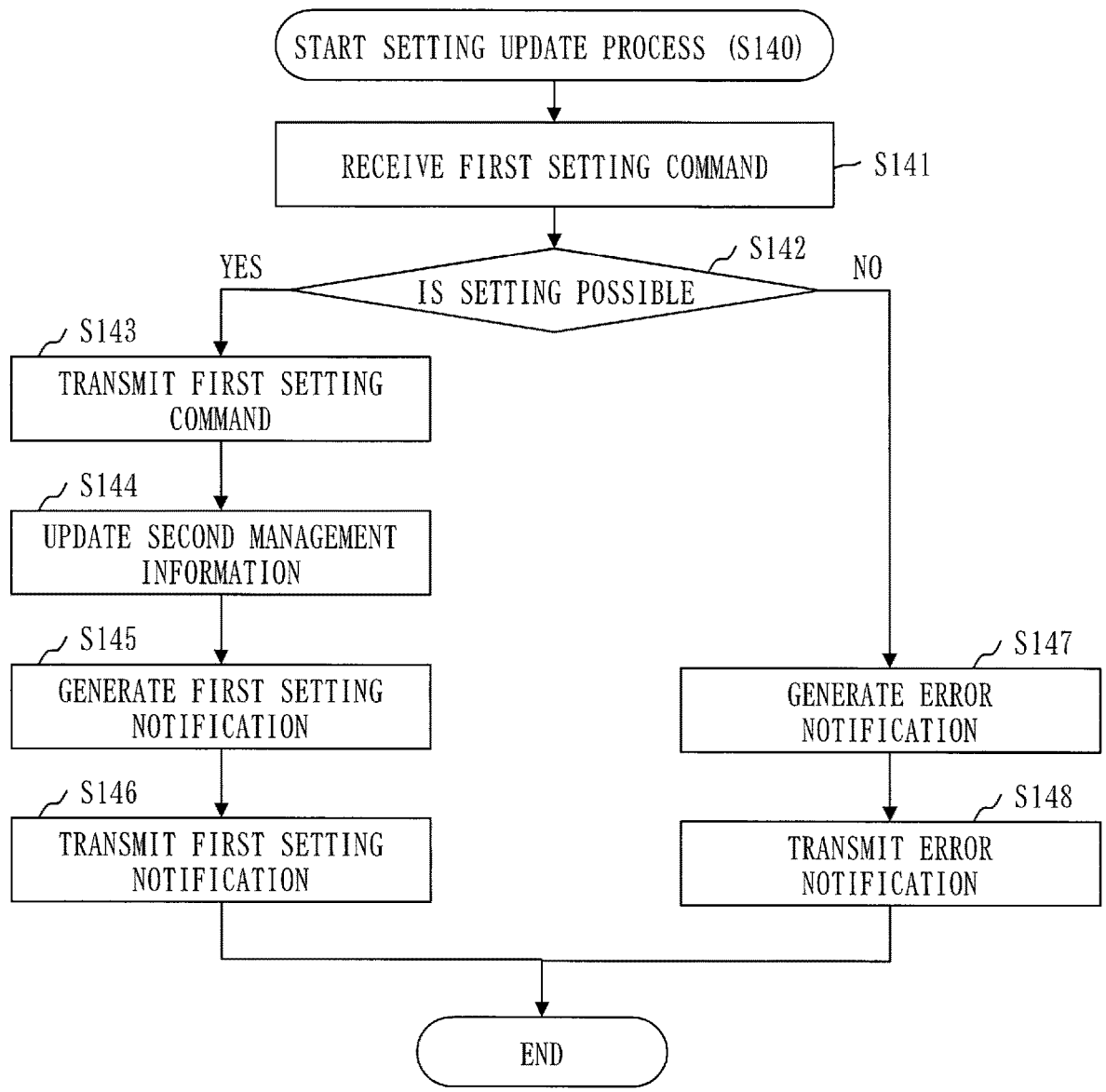
FIG. 10 is a flowchart of a setting update process (S140) in the second embodiment.

Step S171 is a process corresponding to step S141 described in the second embodiment based on FIG. 10.

In step S171, a second receiving unit 381 receives the first setting command.

Specifically, the second receiving unit 381 receives a packet including the first setting command or the packet including the first setting command and the priority flag.

Step S172 is a process corresponding to step S141 described in the second embodiment based on FIG. 10.

In step S172, a second determination unit 350 determines possibility or impossibility of the first setting, based on the second management information 391. The method of the determination is the same as that in step S103 described in the first embodiment based on FIG. 4.

If the first setting has been determined to be possible, the procedure proceeds to step S173.

If the first setting has been determined to be impossible, the procedure proceeds to step S177.

In step S177, the second determination unit 350 determines whether the priority flag is added to the first setting command.

If the priority flag is added to the first setting command, the procedure proceeds to step S173.

If the priority flag is not added to the first setting command, the procedure proceeds to step S178.

A flow of processes from step S173 to step S176 is the same as the flow of the processes from step S143 to step S146 described in the second embodiment based on FIG. 10.

However, step S174 is partially different from step S144.

In step S174, a second update unit 330 updates the second management information 391 to information associated with the first setting.

Specifically, the second update unit 330 acquires the priority corresponding to the setting command from the second priority information 393 and updates the second management information 391 to the first setting command and the acquired priority.

Step S178 and step S179 are the same as step S147 and step S148 described in the second embodiment based on FIG. 10.

Figure 5:
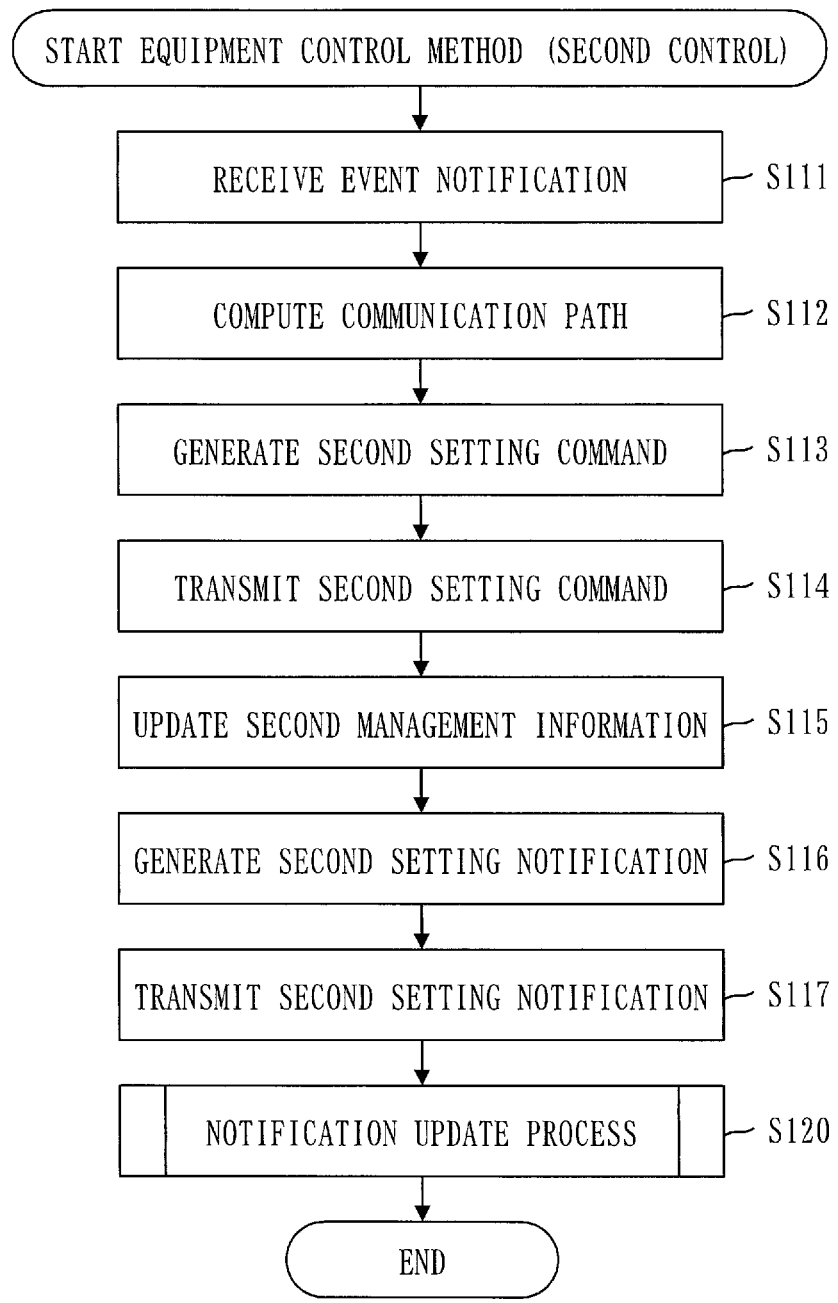
FIG. 5 is a flowchart of an equipment control method (second control) in the first embodiment.
Figure 6:
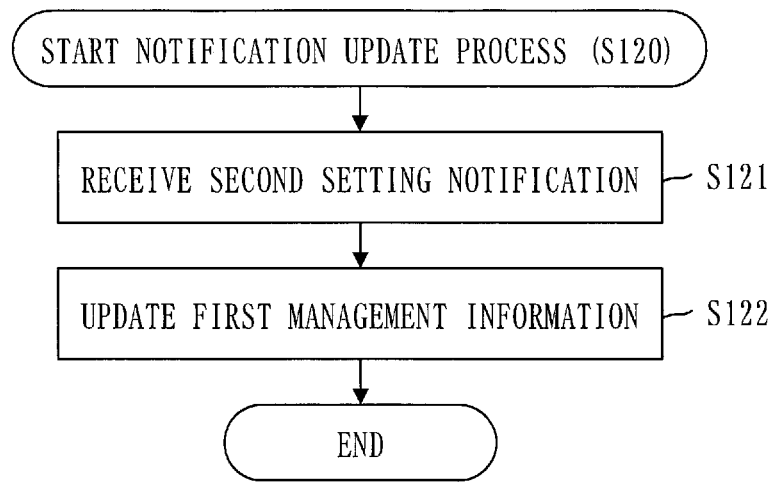
FIG. 6 is a flowchart of a notification update process (S120) in the first embodiment.

A flow of processes of an equipment control method (second control) is the same as the flow of the processes described in the first embodiment based on FIGS. 5 and 6.

In step S115, step S116, and step S122, however, the processes are partially different.

In step S115, the second update unit 330 acquires the priority corresponding to second setting from the second priority information 393.

Specifically, the second update unit 330 acquires, from the second priority information 393 in FIG. 13, the priority corresponding to an event that has occurred in a network system 105.

Then, the second update unit 330 updates the second management information 391 to information associated with the second setting.

Specifically, the second update unit 330 updates the second management information 391 to a second setting command and the acquired priority.

In step S116, a second notification unit 340 generates a second setting notification.

Specifically, the second setting notification is information including the second setting command and an event identifier. The event identifier identifies the event that has occurred in the network system 105.

In step S122, the first update unit 240 acquires the priority corresponding to a first second setting notification from the first priority information 293.

Specifically, the first update unit 240 acquires, from the first priority information 293 in FIG. 13, the priority corresponding to the event identifier included in the second setting notification.

Then, the first update unit 240 updates the first management information 291 to the information associated with the second setting.

Specifically, the first update unit 240 updates the first management information 291 to the second setting command and the acquired priority.

Effect of Third Embodiment

Since the priority of each setting is managed, flexibility of control over the communication equipment 110 in the second network 106 is improved. That is, in both of cases where the second network 106 is controlled from the first control apparatus 200 and where the second network 106 is controlled from the second control apparatus 300, the flexibility of the control can be improved.

\*\*\*Alternative Configuration\*\*\*

The inquiry about the necessity or nonnecessity of the first setting may be made to a manager who uses a terminal apparatus 107. In this case, a first receiving unit 281 functions as the first acceptance unit 283.

Fourth Embodiment

A description will be given about an embodiment where a first control apparatus 200 directly performs first setting for communication equipment 110 when a second control apparatus 300 does not perform setting for the communication equipment 110, based on FIGS. 19 to 24. What has been described in one of the first to third embodiments will, however, be omitted or simplified.

\*\*\*Description of Configuration\*\*\*

A configuration of an equipment control system 100 is the same as that in the first embodiment.

Figure 18:
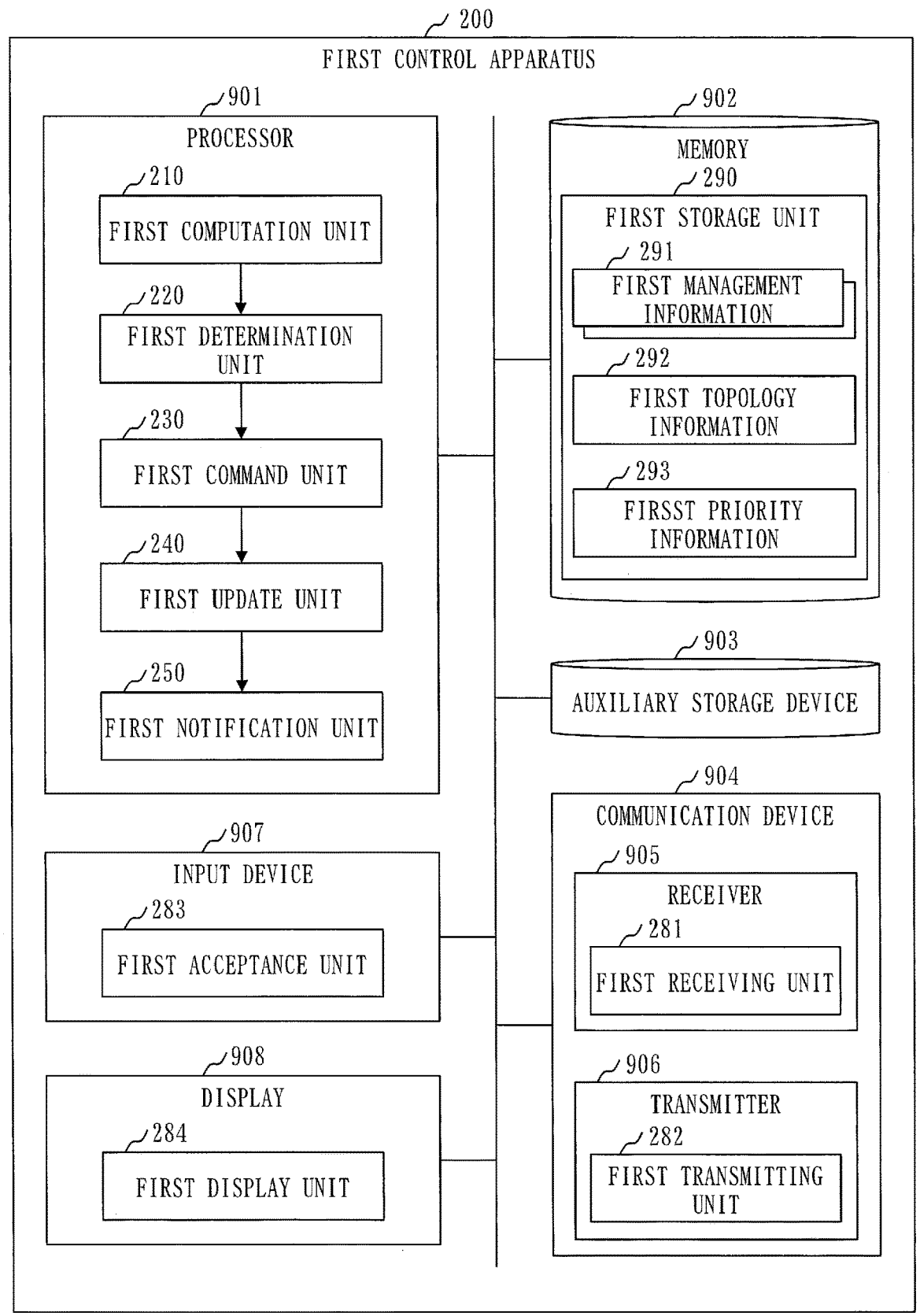
FIG. 18 is a configuration diagram of a first control apparatus 200 in a fourth embodiment.

A configuration of the first control apparatus 200 will be described, based on FIG. 18.

In addition to the components described in the third embodiment, the first control apparatus 200 includes a first notification unit 250. A function of the first notification unit 250 will be described later.

Figure 19:
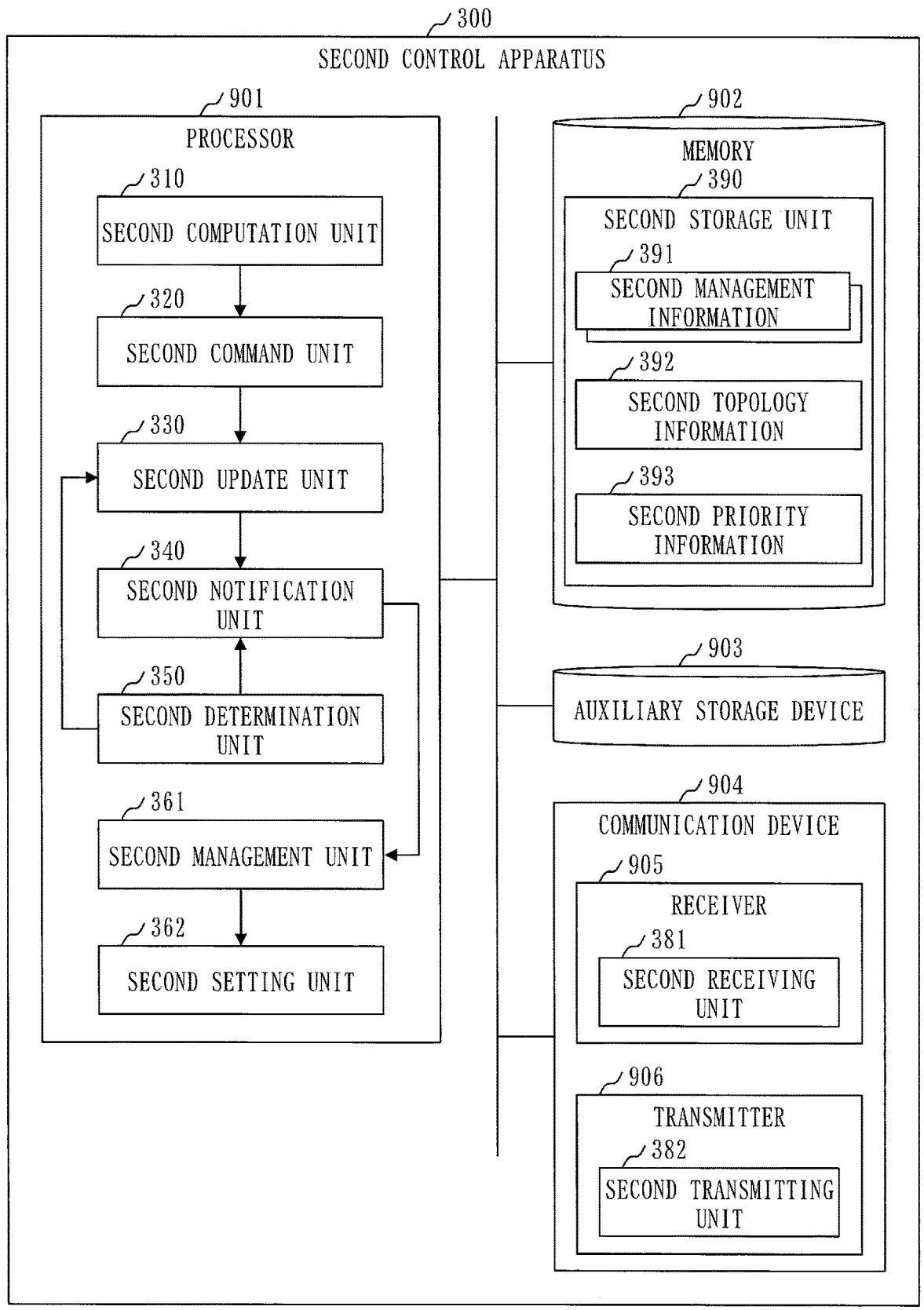
FIG. 19 is a configuration diagram of a second control apparatus 300 in the fourth embodiment.

A configuration of the second control apparatus 300 will be described, based on FIG. 19.

In addition to the components described in the third embodiment, the second control apparatus 300 includes a second management unit 361 and a second setting unit 362, as functional components.

A function of each of the second management unit 361 and the second setting unit 362 will be described later.

Second management information 391 includes a status flag.

The status flag is information indicating whether or not update of first management information 291 in the first control apparatus 200 has been completed.

A flag value indicating that the update of the first management information 291 has been completed is written as completion, and a flag value indicating that the update of the first management information 291 has not been completed is written as during update.

\*\*\*Description of Operations\*\*\*

Figure 20:
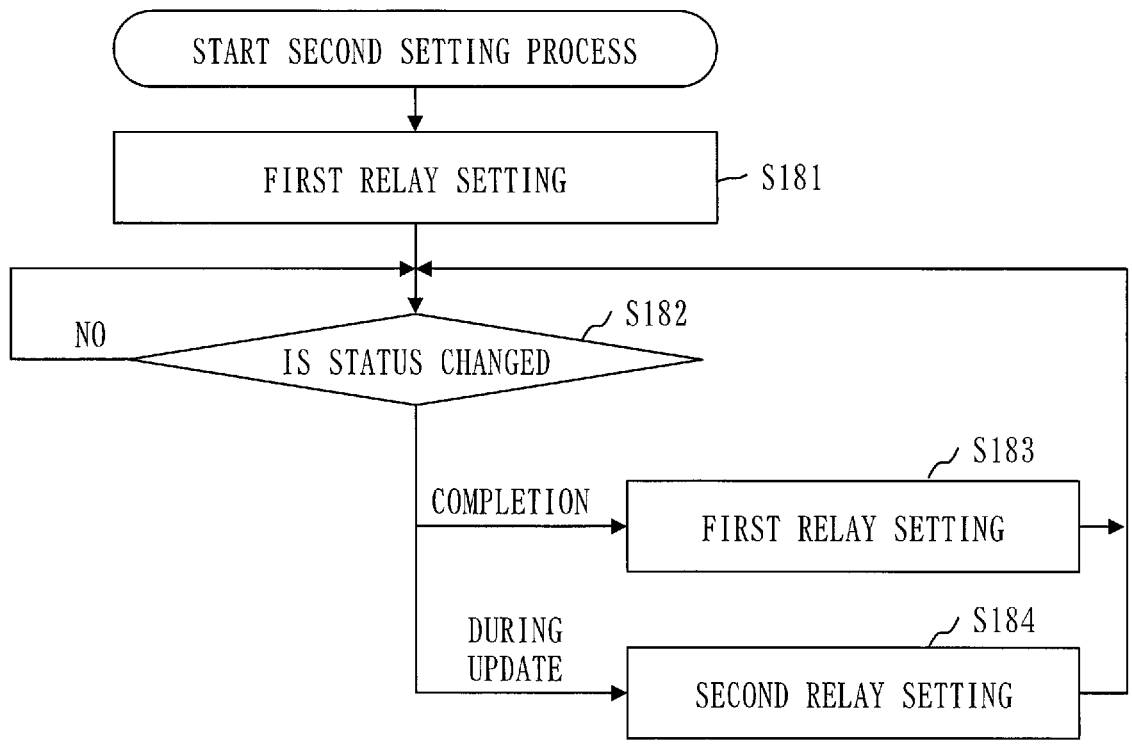
FIG. 20 is a flowchart of a second setting process in the fourth embodiment.

A second setting process will be described, based on FIG. 20.

The second setting process is a process to be executed by the second setting unit 362.

In step S181, the second setting unit 362 performs first relay setting for each of relay apparatuses included in a network system 105.

The first relay setting is setting for causing a first setting command transmitted from the first control apparatus 200 to be forwarded to communication equipment 110 and the second control apparatus 300.

The relay apparatus for which the first relay setting has been performed forwards the first setting command transmitted from the first control apparatus 200 to the communication equipment 110 and the second control apparatus 300. Specifically, the relay apparatus forwards a packet including the first setting command to the communication equipment 110, and transmits a duplicate of the packet to the second control apparatus 300. When the communication equipment 110 receives the first setting command, the communication equipment 110 updates setting of its own to the first setting.

Specifically, the second setting unit 362 generates a first relay command for making setting of the relay apparatus the first relay setting, and inputs the generated first relay command to a first transmitting unit 282. Then, the first transmitting unit 282 transmits a packet including the first relay command to the relay apparatus. When the relay apparatus receives the packet including the first relay command, the relay apparatus updates setting of its own setting to the first relay setting.

In step S182, the second setting unit 362 periodically monitors the status flag included in the second management information 391 and determines presence or absence of a change in the status flag.

If the status flag has been changed from the during update to the completion, the procedure proceeds to step S183.

If the status flag has been changed from the completion to the during update, the procedure proceeds to step S184.

In step S183, the second setting unit 362 performs the first relay setting for each relay apparatus included in the network system 105. The method of the setting is the same as that in step S181.

In step S184, the second setting unit 362 performs second relay setting for each relay apparatus included in the network system 105.

The second relay setting is setting for causing the first setting command transmitted from the first control apparatus 200 to be forwarded to the second control apparatus 300. The method of the setting is the same as that in step S181.

The relay apparatus for which the second relay setting has been performed forwards the first setting command transmitted from the first control apparatus 200 to the second control apparatus 300 without forwarding the first setting command to the communication equipment 110.

Figure 15:
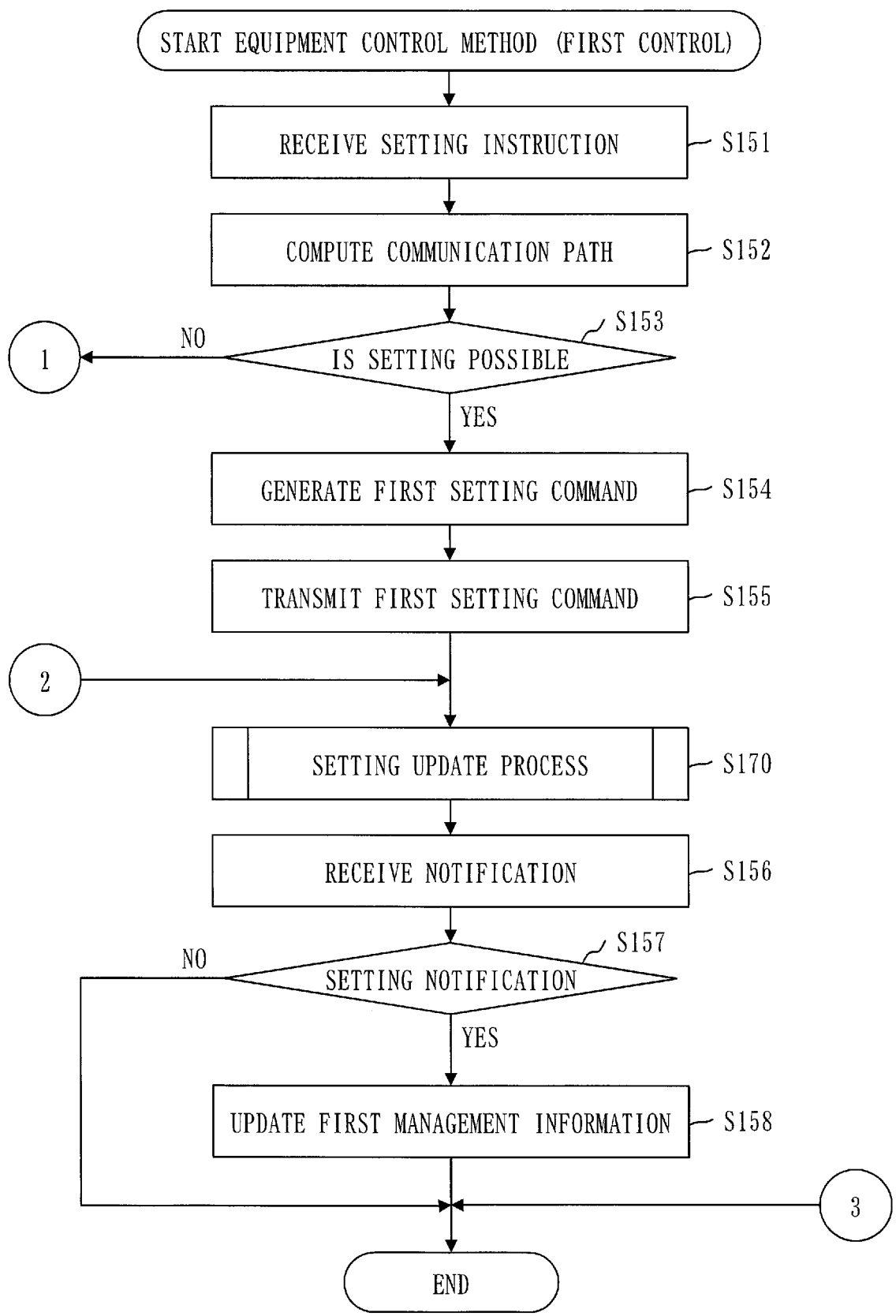
FIG. 15 is a flowchart of an equipment control method (first control) in the third embodiment.
Figure 16:
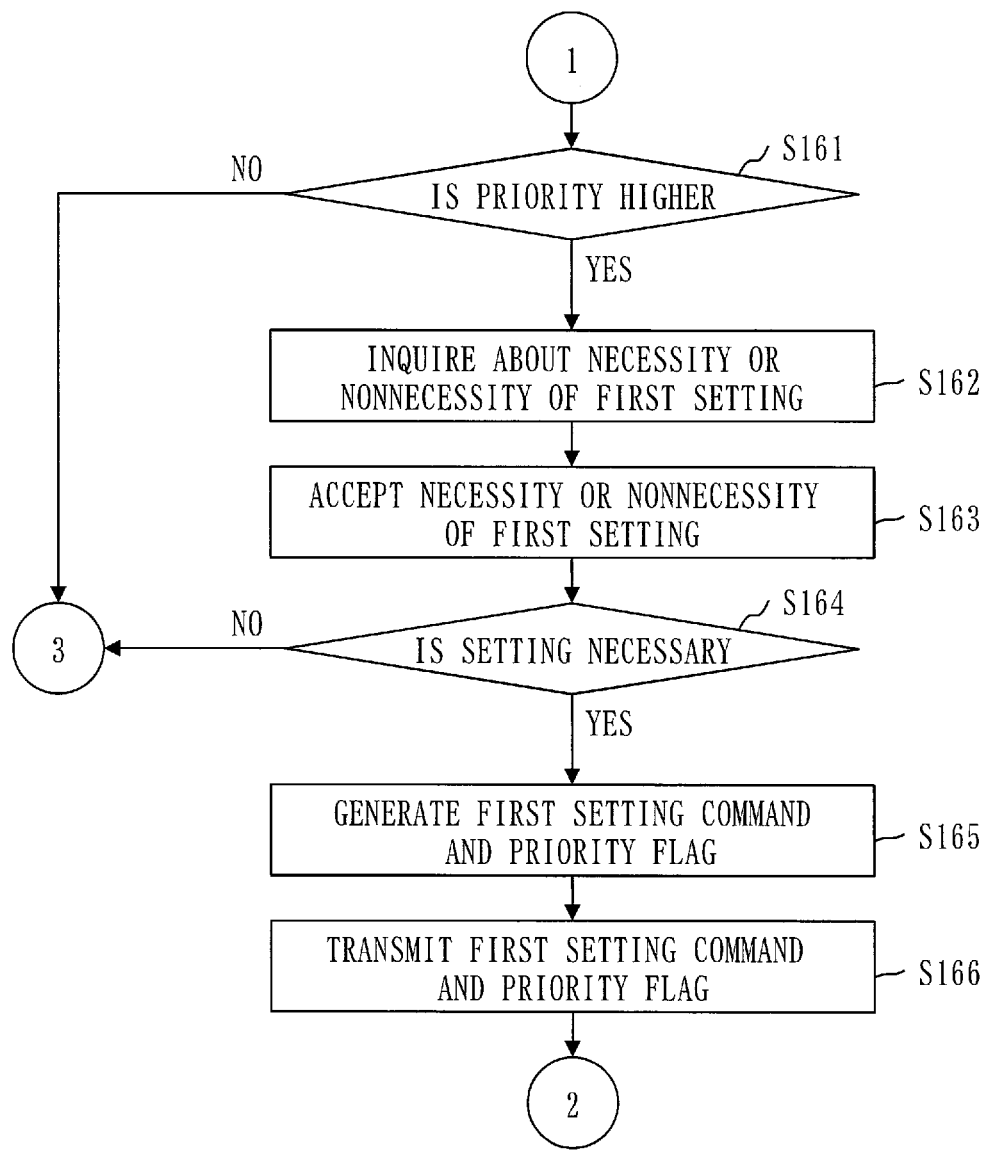
FIG. 16 is a flowchart of the equipment control method (first control) in the third embodiment.

A flow of processes of an equipment control method (first control) is the same as the flow of the processes in the third embodiment described based on FIGS. 15 and 16.

However, a part of a setting update process (S170) is different from that in the third embodiment.

Figure 21:
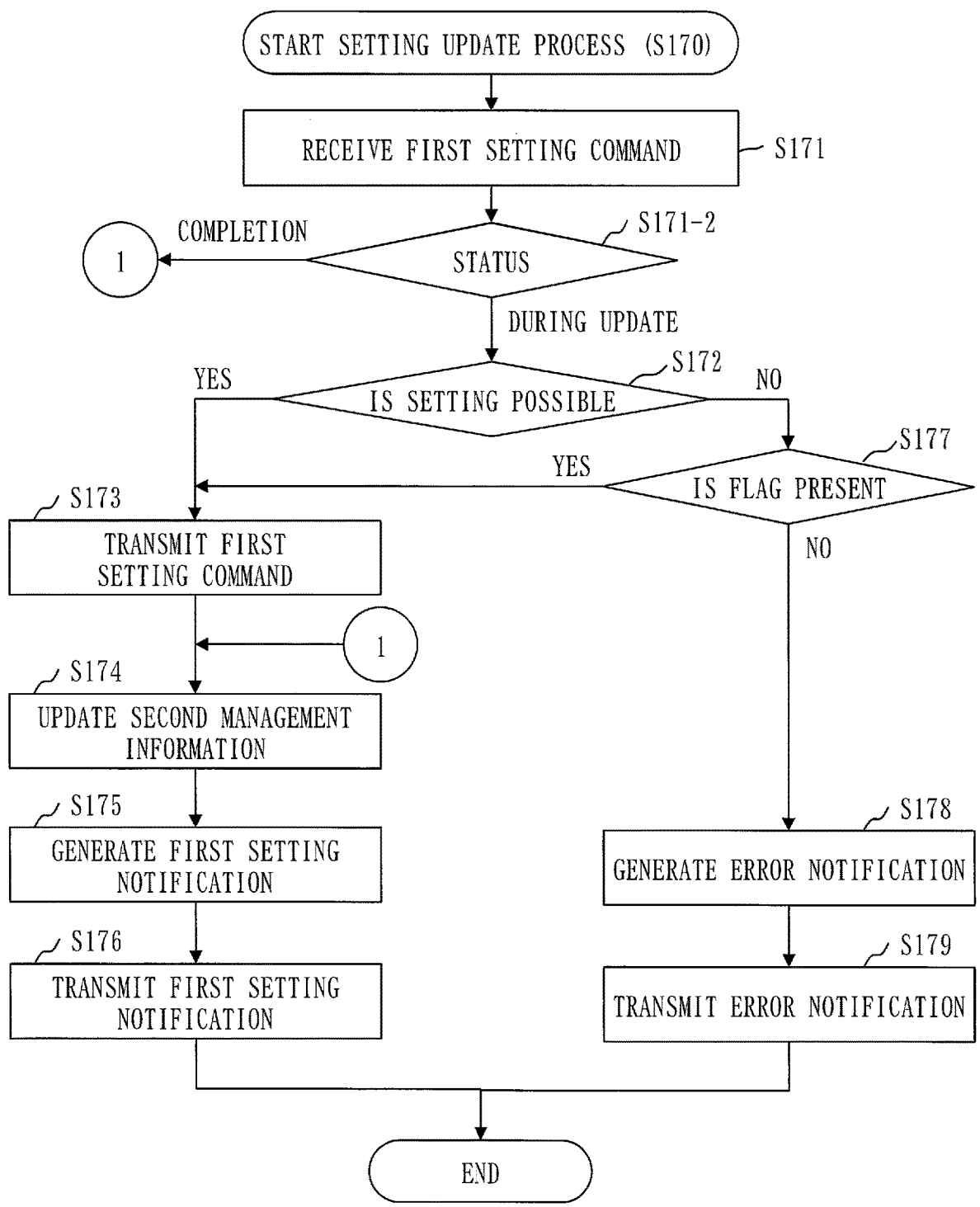
FIG. 21 is a flowchart of a setting update process (S170) in the fourth embodiment.

The setting update process (S170) will be described, based on FIG. 21.

Figure 17:
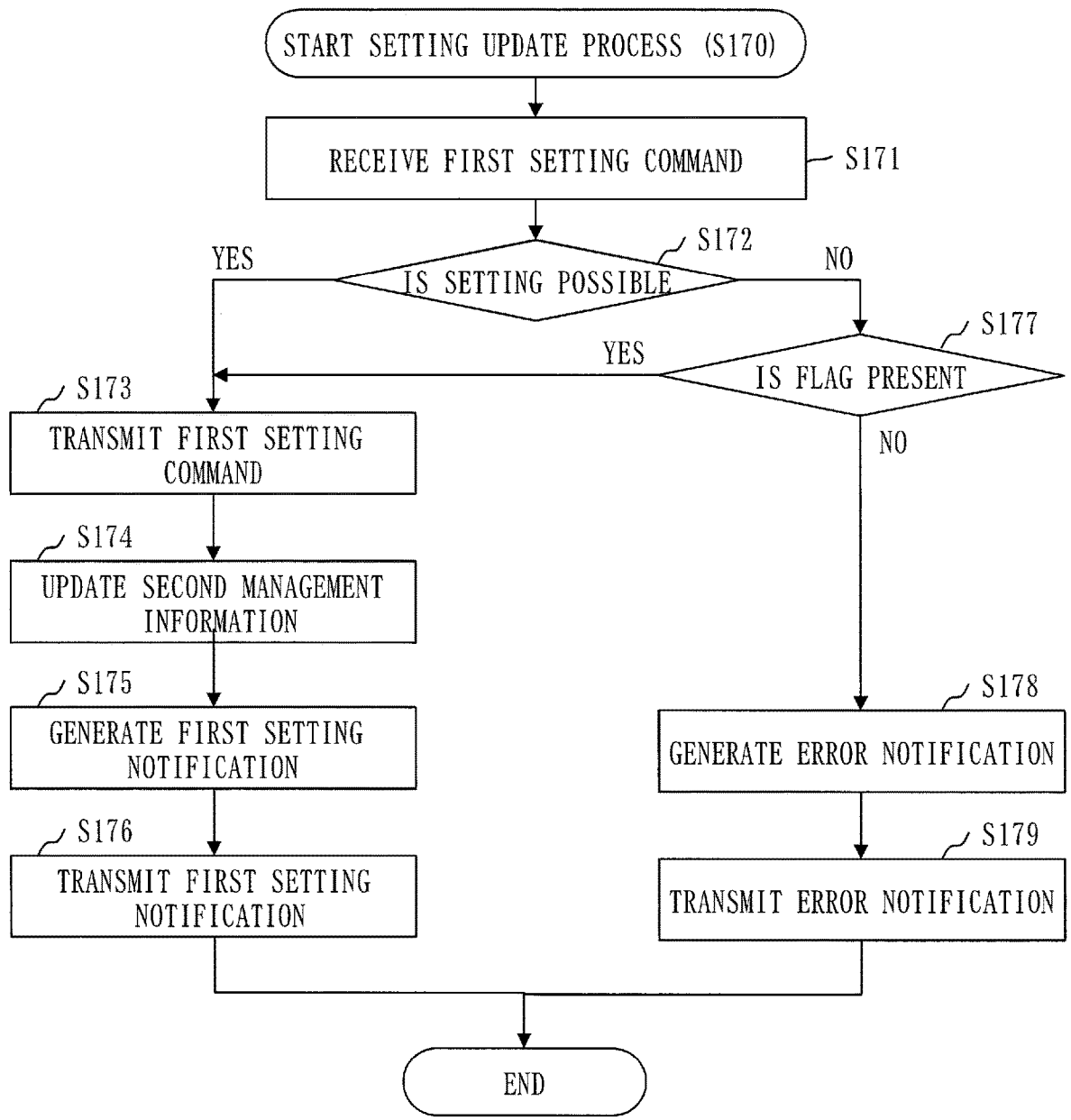
FIG. 17 is a flowchart of a setting update process (S170) in the third embodiment.

The setting update process (S170) is a process to which step S171-2 has been added to the process in the third embodiment described based on FIG. 17.

In step S171-2, the second management unit 361 determines which one of the states of the during update and the completion the status flag included in the first management information 291 indicates.

If the status flag indicates the during update, the procedure proceeds to step S172.

If the status flag indicates the completion, the procedure proceeds to step S174.

Figure 22:
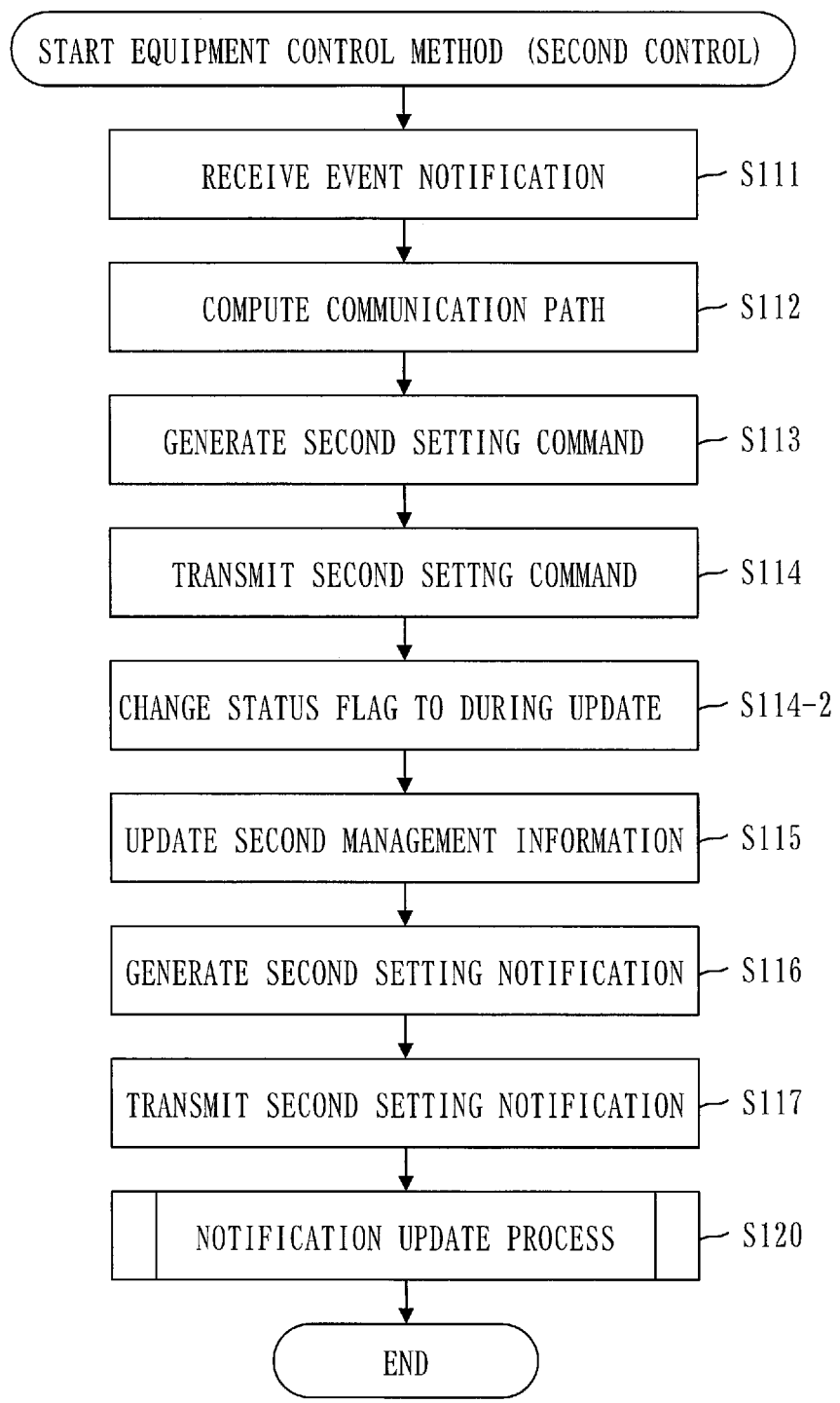
FIG. 22 is a flowchart of an equipment control method (second control) in the fourth embodiment.

An equipment control method (second control) will be described, based on FIG. 22.

The equipment control method (second control) is a method in which step S114-2 has been added to the processes in the first embodiment described based on FIG. 5.

In step S114-2, the second management unit 361 changes the status flag included in the first management information 291 from the completion to the during update.

Figure 23:
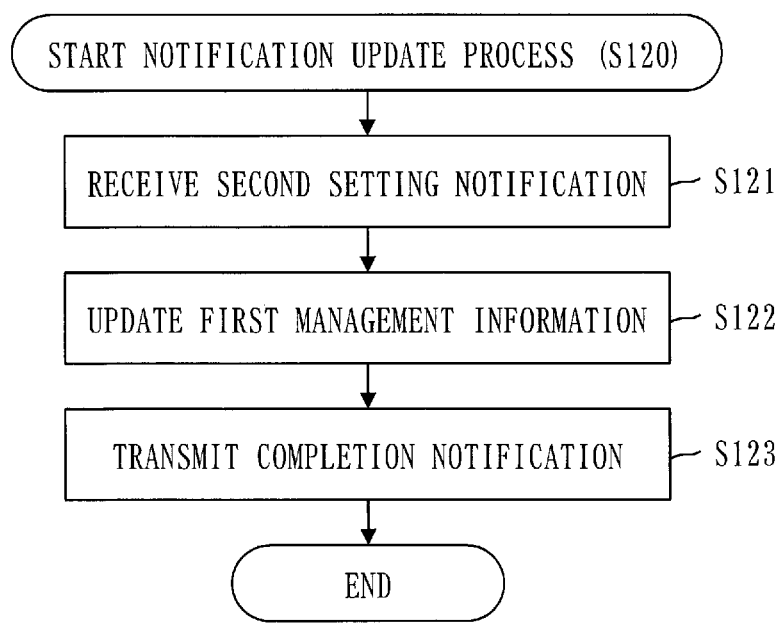
FIG. 23 is a flowchart of a notification update process (S120) in the fourth embodiment.

A notification update process (S120) will be described, based on FIG. 23.

The notification update process (S120) is a process in which step S123 has been added to the processes in the first embodiment described based on FIG. 6.

In step S123, the first notification unit 250 generates a completion notification, and a first receiving unit 281 transmits the completion notification to the second control apparatus 300. The completion notification is a notification for informing that the first management information 291 has been updated.

Figure 24:
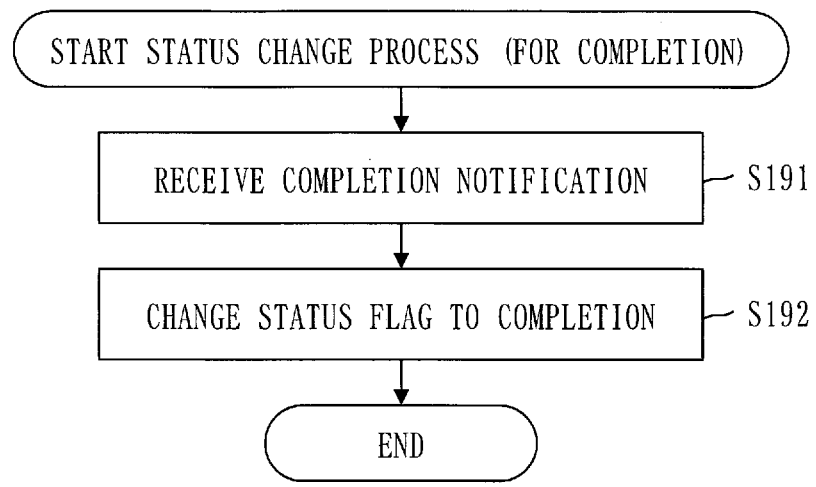
FIG. 24 is a flowchart of a state change process (for completion) in the fourth embodiment.

A status change process (for completion) will be described, based on FIG. 24.

The status change process (for completion) is a process to be executed when the completion notification has been transmitted from the first control apparatus 200 to the second control apparatus 300.

In step S191, a second receiving unit 381 receives the completion notification.

In step S192, the second management unit 361 changes the status flag included in the first management information 291 from the during update to the completion.

Effect of Fourth Embodiment

When the second control apparatus 300 does not control the communication equipment 110 in a second network 106, the first setting from the first control apparatus 200 is directly performed for the communication equipment 110 without via the second control apparatus 300. This can improve quickness in control over the second network 106.

Supplement to the Embodiments

In the embodiments, functions of each of the first control apparatus 200 and the second control apparatus 300 may be implemented by hardware.

Figure 25:
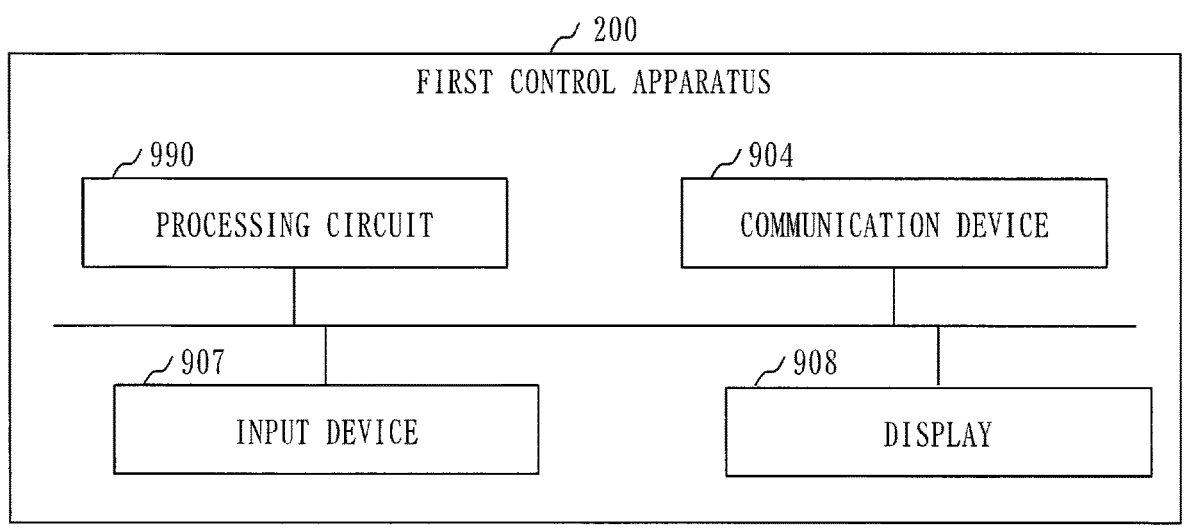
FIG. 25 is a hardware configuration diagram of the first control apparatus 200 in each embodiment.

FIG. 25 illustrates a configuration when the functions of the first control apparatus 200 are implemented by the hardware.

The first control apparatus 200 includes a processing circuit 990. The processing circuit 990 is also referred to as processing circuitry.

The processing circuit 990 is a dedicated electronic circuit to implement the functions of the respective "units" described in each embodiment. These "units" include the first storage unit 290 as well.

Specifically, the processing circuit 990 is a single circuit, a composite circuit, a programmed processor, a parallel-programmed processor, a logic IC, a GA, an ASIC, an FPGA or a combination of these components. The GA is abbreviation for Gate Array, the ASIC is abbreviation for Application Specific Integrated Circuit, and the FPGA is abbreviation for Field Programmable Gate Array.

The first control apparatus 200 may include a plurality of the processing circuits 990 and the plurality of the processing circuits 990 may cooperate and implement the functions of the "units".

The functions of the first control apparatus 200 may be implemented by a combination of the software and the hardware. That is, a part of the "units" may be implemented by the software, and the remainder of the "units" may be implemented by the hardware.

Figure 26:
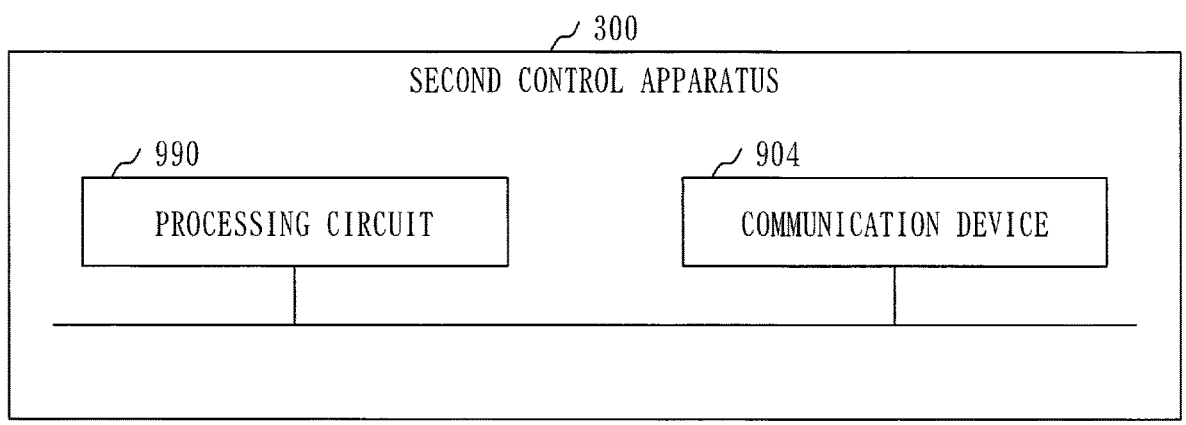
FIG. 26 is a hardware configuration diagram of the second control apparatus 300 in each embodiment.

FIG. 26 illustrates a configuration when the functions of the second control apparatus 300 are implemented by the hardware.

The second control apparatus 300 includes a processing circuit 990. The processing circuit 990 is also referred to as processing circuitry.

The processing circuit 990 is a dedicated electronic circuit to implement the functions of the respective "units" described in each embodiment. These "units" include the second storage unit 290 as well.

The second control apparatus 300 may include a plurality of the processing circuits 990 and the plurality of the processing circuits 990 may cooperate and implement the functions of the "units".

The functions of the second control apparatus 300 may be implemented by a combination of the software and the hardware. That is, a part of the "units" may be implemented by the software, and the remainder of the "units" may be implemented by the hardware.

Each embodiment is an illustration of a preferred embodiment, and does not intend to limit the technical scope of the present invention. Each embodiment may be partially carried out or may be carried out by being combined with a different embodiment. Each procedure described by using the flowchart and so on may be changed as necessary.

REFERENCE SIGNS LIST

100: equipment control system; 101: first base; 102: second base; 103: third base; 104: first network; 105: network system; 106: second network; 107: terminal apparatus; 110: communication equipment; 120: event detection apparatus; 200: first control apparatus; 210: first computation unit; 220: first determination unit; 230: first command unit; 240: first update unit; 250: first notification unit; 281: first receiving unit; 282: first transmitting unit; 283: first acceptance unit; 284: first display unit; 290: first storage unit; 291: first management information; 292: first topology information; 293: first priority information; 300: second control apparatus; 310: second computation unit; 320: second command unit; 330: second update unit; 340: second notification unit; 350: second determination unit; 361: second management unit; 362: second setting unit; 381: second receiving unit; 382: second transmitting unit; 390: second storage unit; 391: second management information; 392: second topology information; 393: second priority information; 901: processor; 902: memory; 903: auxiliary storage device; 904: communication device; 905: receiver; 906: transmitter; 907: input device; 908: display; 990: processing circuit

The invention claimed is:

1. A control apparatus in a first base, comprising:
processing circuitry to store first management information for managing setting of communication equipment in a second base, the second base being a base different from the first base;
an input device;
a transmitter; and
a receiver,
wherein the input device accepts a setting instruction that instructs first setting, the first setting being setting for the communication equipment and being setting associated with a first communication path,
wherein the processing circuitry computes the first communication path based on the setting instruction, converts the first communication path, and generate a first setting command for making the setting of the communication equipment the first setting;

wherein the transmitter transmits the first setting command, and wherein the receiver receives a second setting notification, the second setting notification being a notification that is transmitted from a second control apparatus in the second base when the second control apparatus makes the setting of the communication equipment second setting associated with a second communication path and being a notification for informing the second setting, and wherein the processing circuitry updates the first management information to information associated with the first setting when the first setting command is transmitted and updates the first management information to information associated with the second setting when the second setting notification is received.

2. The control apparatus according to claim 1, wherein the first setting command is received by the second control apparatus and is transmitted to the communication equipment from the second control apparatus, wherein the receiver receives a first setting notification being a notification that is transmitted from the second control apparatus and being a notification for informing the first setting, and wherein the processing circuitry updates the first management information to the information associated with the first setting when the first setting notification is received.

3. The control apparatus according to claim 2, wherein the transmitter transmits a completion notification to the second control apparatus when the first management information is updated.

4. The control apparatus according to claim 1, wherein the processing circuitry determines possibility or impossibility of the first setting, based on the first management information, and wherein the transmitter transmits the first setting command when the first setting is determined to be possible.

5. The control apparatus according to claim 4, wherein the first management information includes a priority of the setting of the communication equipment, wherein the processing circuitry determines which one of a priority corresponding to the setting instruction and the priority included in the first management information is higher, and wherein the input device accepts a determination result indicating necessity or nonnecessity of the first setting when the first setting is determined to be impossible and the priority corresponding to the setting instruction is higher, and wherein the transmitter transmits the first setting command when the determination result indicating that the first setting is necessary is accepted.

6. A non-transitory computer readable medium storing a control program for causing a control apparatus being a computer in a first base to function, the control program for causing the computer to execute:

a first acceptance process of accepting a setting instruction that instructs first setting, the first setting being setting for communication equipment in a second base and being setting associated with a first communication path, the second base being a base different from the first base;

a first computation process of computing the first communication path, based on the setting instruction;

a first command process of converting the first communication path and generating a first setting command for making setting of the communication equipment the first setting;

a first transmission process of transmitting the first setting command;

a first reception process of receiving a second setting notification, the second setting notification being a notification that is transmitted from a second control apparatus in the second base when the second control apparatus makes the setting of the communication equipment second setting associated with a second communication path and being a notification for informing the second setting; and a first update process of updating first management information for managing the setting of the communication equipment to information associated with the first setting when the first setting command is transmitted and updating the first management information to information associated with the second setting when the second setting notification is received.

7. A control apparatus in a second base including communication equipment, the control apparatus comprising:

processing circuitry to:

compute a second communication path according to an event that has occurred in a network system constructed in the second base, convert the second communication path and generate a second setting command for making setting of the communication equipment second setting associated with the second communication path, and generate a second setting notification for informing the second setting when the second setting command is generated; and a transmitter to transmit the second setting command to the communication equipment and to transmit the second setting notification to a first control apparatus, the first control apparatus being included in a first base different from the second base and making the setting of the communication equipment first setting associated with a first communication path, wherein the processing circuitry stores second management information for managing the setting of the communication equipment, the control apparatus further comprising:

a receiver to receive a first setting command being a command that is transmitted from the first control apparatus and being a command for making the setting of the communication equipment the first setting, wherein the processing circuitry determines possibility or impossibility of the first setting based on the second management information when the first setting command is received, and generates a first setting notification for informing the first setting when the first setting is determined to be possible, and wherein the transmitter transmits the first setting command to the communication equipment and transmits the first setting notification to the first control apparatus when the first setting is determined to be possible.

8. The control apparatus according to claim 7, wherein the network system includes a relay apparatus, wherein the second management information includes a status flag indicating during update or completion, wherein the processing circuitry manages the status flag, and performs setting for the relay apparatus, the setting being one of first relay setting for causing the first setting command transmitted from the first control apparatus to be forwarded to the communication equipment and the control apparatus and second relay setting for causing the first setting command transmitted from the first control apparatus to be forwarded to the control apparatus, wherein the receiver receives a completion notification that is transmitted from the first control apparatus after the first setting notification has been transmitted to the first control apparatus, and wherein the processing circuitry changes the status flag to the during update when the second setting notification is transmitted to the first control apparatus and changes the status flag to the completion when the completion notification is received, and performs the first relay setting for the relay apparatus when the status flag is changed to the completion and performs the second relay setting for the relay apparatus when the status flag is changed to the during update.

9. A non-transitory computer readable medium storing a control program for causing a control apparatus being a computer in a second base including communication equipment to function, the control program for causing the computer to execute:
 a second computation process of computing a second communication path according to an event that has occurred in a network system constructed in the second base;
 a second command process of converting the second communication path and generating a second setting command for making setting of the communication equipment second setting associated with the second communication path;
 a second notification process of generating a second setting notification for informing the second setting when the second setting command is generated; and
 a second transmission process of transmitting the second setting command to the communication equipment and transmitting the second setting notification to a first control apparatus, the first control apparatus being included in a first base different from the second base and making the setting of the communication equipment first setting associated with a first communication path, wherein the processing circuitry stores second management information for managing the setting of the communication equipment, the control apparatus further comprising:
a receiver to receive a first setting command being a command that is transmitted from the first control apparatus and being a command for making the setting of the communication equipment the first setting, wherein the processing circuitry determines possibility or impossibility of the first setting based on the second management information when the first setting command is received, and generates a first setting notification for informing the first setting when the first setting is determined to be possible, and wherein the transmitter transmits the first setting command to the communication equipment and transmits the first setting notification to the first control apparatus when the first setting is determined to be possible.

10. An equipment control system comprising:
a first control apparatus in a first base and a second control apparatus in a second base,
the first control apparatus including:
processing circuitry to store first management information for managing setting of communication equipment in the second base,
an input device;
a transmitter; and
a receiver,
wherein the input device accepts a setting instruction that instructs first setting, the first setting being setting for the communication equipment and being setting associated with a first communication path,
wherein the processing circuitry computes the first communication path, based on the setting instruction,
converts the first communication path, and generates a first setting command for making the setting of the communication equipment the first setting,
wherein the transmitter transmits the first setting command;
wherein the receiver receives a second setting notification, the second setting notification being a notification that is transmitted from the second control apparatus when the second control apparatus in the second base makes the setting of the communication equipment second setting associated with a second communication path and being a notification for informing the second setting, and
wherein the processing circuitry updates the first management information to information associated with the first setting when the first setting command is transmitted and updates the first management information to information associated with the second setting when the second setting notification is received,
the second control apparatus including:
processing circuitry to compute the second communication path, according to an event that has occurred in a network system constructed in the second base,
convert the second communication path and generate a second setting command for making the setting of the communication equipment the second setting, and
generate the second setting notification when the second setting command is generated; and
a transmitter to transmit the second setting command to the communication equipment and to transmit the second setting notification to the first control apparatus.

* * * * *